(12) United States Patent
Elortegui et al.

(10) Patent No.: US 11,508,413 B1
(45) Date of Patent: Nov. 22, 2022

(54) SYSTEMS AND METHODS FOR EDITING MEDIA COMPOSITION FROM MEDIA ASSETS

(71) Applicant: Verizon Patent and Licensing Inc., Basking Ridge, NJ (US)

(72) Inventors: Daniel Elortegui, Manhattan Beach, CA (US); Jay Cee Straley, Manhattan Beach, CA (US); Praveen Nair, El Segundo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/458,652

(22) Filed: Aug. 27, 2021

(51) Int. Cl.
| | | |
|---|---|---|
| *G11B 27/34* | (2006.01) | |
| *G11B 27/034* | (2006.01) | |
| *G06F 16/783* | (2019.01) | |
| *G06F 16/683* | (2019.01) | |
| *G06N 20/00* | (2019.01) | |

(52) U.S. Cl.
CPC ............ *G11B 27/34* (2013.01); *G06F 16/683* (2019.01); *G06F 16/783* (2019.01); *G06N 20/00* (2019.01); *G11B 27/034* (2013.01)

(58) Field of Classification Search
CPC ..... G11B 27/34; G11B 27/034; G06F 16/783; G06F 16/683; G06N 20/00
See application file for complete search history.

(56) References Cited

U.S. PATENT DOCUMENTS

| | | | | |
|---|---|---|---|---|
| 2001/0040592 | A1* | 11/2001 | Foreman | G11B 27/34 |
| | | | | 375/E7.189 |
| 2011/0161348 | A1* | 6/2011 | Oron | G06F 16/70 |
| | | | | 707/769 |
| 2013/0083036 | A1* | 4/2013 | Cario | G11B 27/034 |
| | | | | 345/473 |

FOREIGN PATENT DOCUMENTS

WO    WO-2005104130 A1 *  11/2005  ........... G11B 27/034

\* cited by examiner

*Primary Examiner* — Thai Q Tran
*Assistant Examiner* — Jose M Mesa

(57) ABSTRACT

Systems and methods for editing a media composition from media assets are provided. An editing device receives a media asset associated with a scene to be rendered in a media composition. The editing device receives a script including script elements that index script sections associated with the scene and metadata. The editing device edits the media composition with segments of the media asset based on a comparison of the segments, the script elements, and the metadata.

20 Claims, 15 Drawing Sheets

SYSTEMS AND METHODS FOR EDITING MEDIA COMPOSITION FROM MEDIA ASSETS

BACKGROUND

Production of media content may include multiple steps and may be performed by a number of individuals assigned to specialized roles. Media content, such as movie content, television content, or streaming production content, may be produced from multiple captured shots output from one or more cameras. A scene of media content may be performed by multiple actors and according to a script. A director may control various aspects of production and a script supervisor may capture notes and/or annotations associated with the script and the performance.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
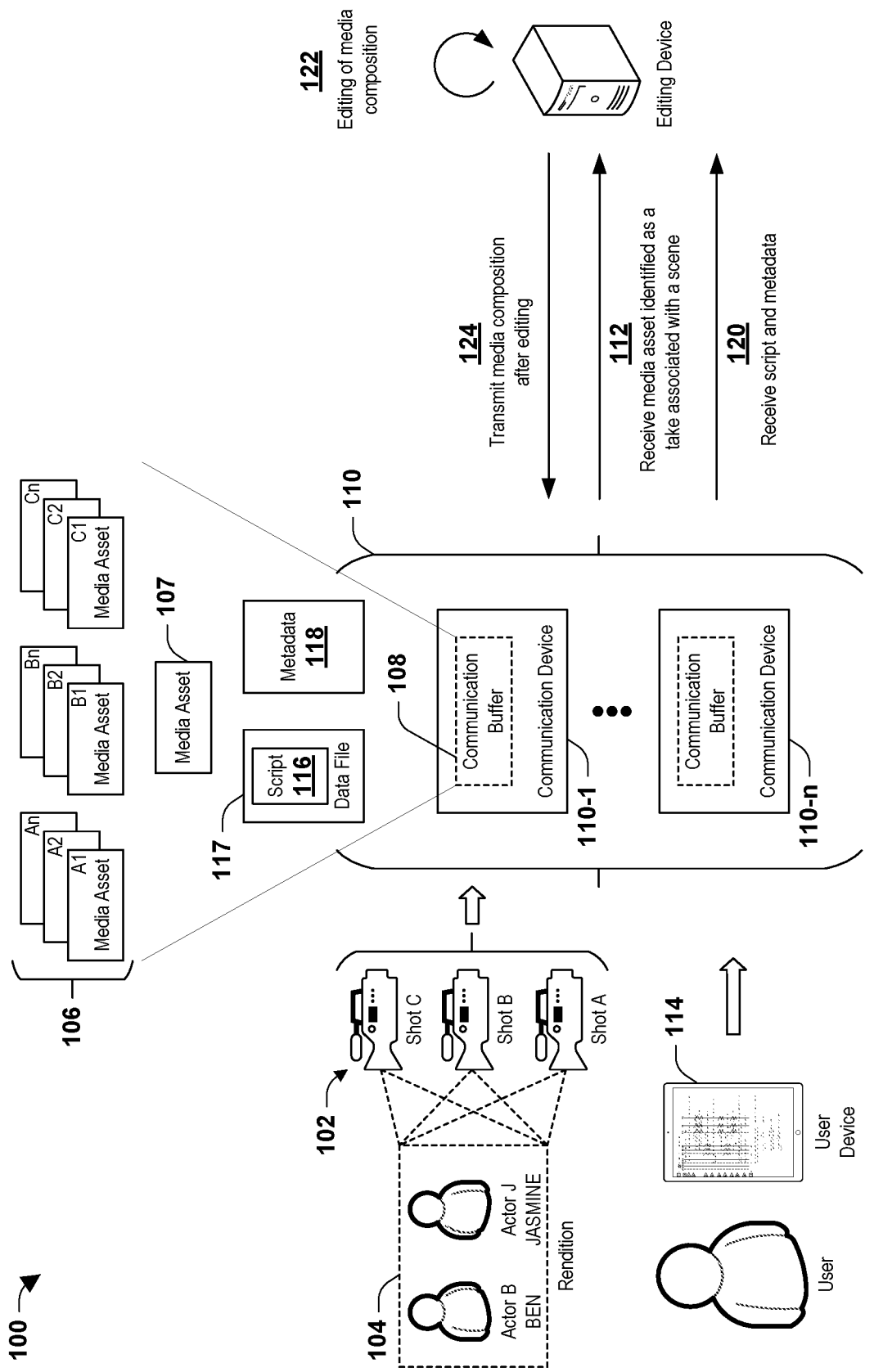
FIG. 1 is a diagram of an example implementation described herein, according to some example embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

Production of media content may combine human aspects and technical aspects. A director may direct multiple performances of a scene to incorporate human aspects of emotion, pronunciation, gesture, etc. Such human aspects may not be fully evaluated until presented in a media composition. Technical aspects of production, such as camera focus, camera steadiness, object framing, etc., may not be discovered until media assets of camera footage are processed. In some implementations of the present disclosure, a first cut of a media composition corresponding to multiple performances of a scene may be processed and assembled in a cloud environment, such as with a multi-access edge computing (MEC) device or an editing device, and presented for evaluation by a user, such as a director, during production.

As used herein, the term "shot" may refer to a camera set up to capture media assets of a rendered scene from a particular view. A media composition of the rendered scene may be edited from several media assets corresponding to several shots. For example, a scene with two actors speaking may include a wide shot "A" capturing both actors, a close-up shot "B" capturing a first actor, and a close-up shot "C" capturing a second actor. Each shot of a rendered scene may be repeated several times to capture several media assets as single continuous recorded performances, known as "takes." For example, the close-up shot "B" capturing the first actor may include three takes: B1, B2, and B3. Production of media content may be fluid and often personal to the users involved. A director may direct a large number of takes of a scene, e.g., 10, 15, 30, etc.

A relatively short scene corresponding to a media composition of, for example, five to ten minutes, may include multiple shots, multiple takes of each shot, and thereby produce multiple media assets corresponding to the multiple takes. For example, 3 shots and 4 takes per shot may produce 12 media assets. Each of the media assets may then be parsed into segments corresponding to sections of the script. The segments may then be indexed and edited into indexed positions of a media composition. A relatively short scene with short dialog between two actors may include multiple script sections, each corresponding to a segment of a media asset. For example, a scene with 10 script sections may correspond to a media composition including 10 segments. In this case, 12 media assets may produce "120" potential segments for editing in a media composition. During production, a script supervisor may "line" the script with annotations to denote sections of the script where an actor is on camera or off camera. The script annotations may include, for example, director instructions to exclude sections of the script, i.e., to exclude corresponding segments of a media asset, from inclusion in the media composition.

One or more systems and/or techniques for editing of a media composition from media assets are provided. In some examples, a system may provide prioritized editing of media assets that originate from one or more cameras. The media assets may be first transferred from the one or more cameras to one or more communication devices. The one or more communication devices, in turn, may upload the media assets to an editing device in a cloud environment or a MEC environment, using a wireless network, such as a 5G cellular network. It is to be understood that the editing device may be a virtual device or a standalone device. It may reside in a MEC platform close to the edge of the network, in a cloud environment or at some other location within a network. The editing device may be provided according to an edge computing network architectural model. Metadata corresponding to notes and/or annotations from a user, such as a script supervisor, may be separately uploaded to the editing device. A digital version of the script may be uploaded to the editing device with the metadata and/or uploaded separately. The media assets, the script, and the metadata may then be processed by the editing device to edit the media composition as a first cut, also known as a rough cut, using Artificial Intelligence/Machine Learning (AI/ML). The media composition may then be transmitted from the editing device through the cellular wireless network to the one or more communication devices for on set review by a user, such as a director. Upon review of the media composition on set, additional takes of the scene may be shot without altering set conditions, such as lighting, camera positions, etc.

FIG. 1 is a diagram illustrating an example implementation 100 described herein, according to some example embodiments. As shown in FIG. 1 and according to an example, one or more cameras 102 may capture media assets 106 that are respectively associated with one or more shots of a rendition 104 of a scene. For example, a camera may be positioned to capture a media asset associated with a shot A, a camera may be positioned to capture a media asset associated with shot B, and a camera may be positioned to capture a media asset associated with shot C. In some implementations, known as a single-camera setup, a single camera may be moved and/or positioned to capture the one or more shots as media assets. In some implementations, the shots may be captured as media assets sequentially, following a sequential order identified in the script, or may be captured non-sequentially. For example, if a scene cuts back and forth between an actor B ("BEN") and an actor J ("JASMINE"), a director may first point the single camera toward actor B and capture part or all of the scene from this angle, then move the single camera toward actor J, relight, and then capture the scene again. In some implementations, known as a multi-camera setup, the one or more cameras may capture the shots as media assets simultaneously.

In some implementations, each shot of the rendition 104 may have one or more takes, where each take may be associated with one of the media assets 106. For example, shot A may have takes A1, A2, . . . , An, respectively corresponding to media assets A1, A2, . . . , An; shot B may have takes B1, B2, . . . , Bn, respectively corresponding to media assets takes B1, B2, . . . , Bn; and shot C may have takes C1, C2, . . . , Cn, respectively corresponding to media assets C1, C2, . . . , Cn; etc. Each media asset output from the one or more cameras 102 may be stored in a communication buffer, such as a communication buffer 108, of one or more communication devices 110. In some implementations, such as a single-camera setup, the one or more cameras 102 may output the media assets 106 to the same communication buffer in a single communication device. In some implementations, such as a multi-camera setup, each of the one or more cameras 102 may output the media assets 106 to a separate corresponding communication device. Other configurations and/or arrangements are within the scope of the present disclosure.

In some implementations and by reference number 112, a media asset may be identified as a take associated with a scene to be rendered in a media composition and may be received by an editing device. For example, a media asset 107 may be received from the one or more communication devices 110 communicatively coupled to the editing device through a network. In some implementations, the network may be a cellular wireless network, for example, a 5G cellular network.

In some implementations, a user device 114 may record script annotations associated with a script 116 from a user located on set during production of the scene. The user device 114 may record the script annotations as metadata 118 and output the metadata 118 and the script 116 to the one or more communication devices 110. For example, the metadata 118 may be formatted and communicated as Extensible Markup Language (XML) data. Additionally and/or alternatively, the script 116 may be formatted and communicated as a data file 117, such as a word processing document. In some implementations, the script 116 may include script elements that index script sections associated with a scene and the metadata 118 may be associated with the script elements and the media asset. In some implementations, and by reference number 120, the editing device may receive the script 116 and the metadata 118 from the one or more communication devices 110. The editing device may receive the script 116 and the metadata 118 together in an integrated document, separately in separate documents, or a combination of both. For example, the editing device may receive the script 116 separately and before receiving the media asset 107. In this case, the editing device may immediately begin processing of the media asset 107 before receipt of the metadata 118 and before complete reception of the media asset 107. In some implementations, the media asset 107 may be streamed from the one or more communication devices 110 or may be in a first position in the communication buffer 108 such that a received portion of the media asset 107 may be received and processed by the editing device.

In some implementations, and by reference number 122, the editing device may perform editing of a media composition from the media asset 107. The media asset 107 may include segments corresponding to sections of the script 116, and the editing device may perform the editing by comparing the segments of the media asset 107, the script elements, and the metadata 118. In some implementations, the editing device may perform the editing with a machine learning model. In some implementations, and by reference number 124, the editing device may transmit the media composition to the one or more communication devices 110 through a network, such as a cellular communication network, after the editing of the media composition.

Figure 2A:
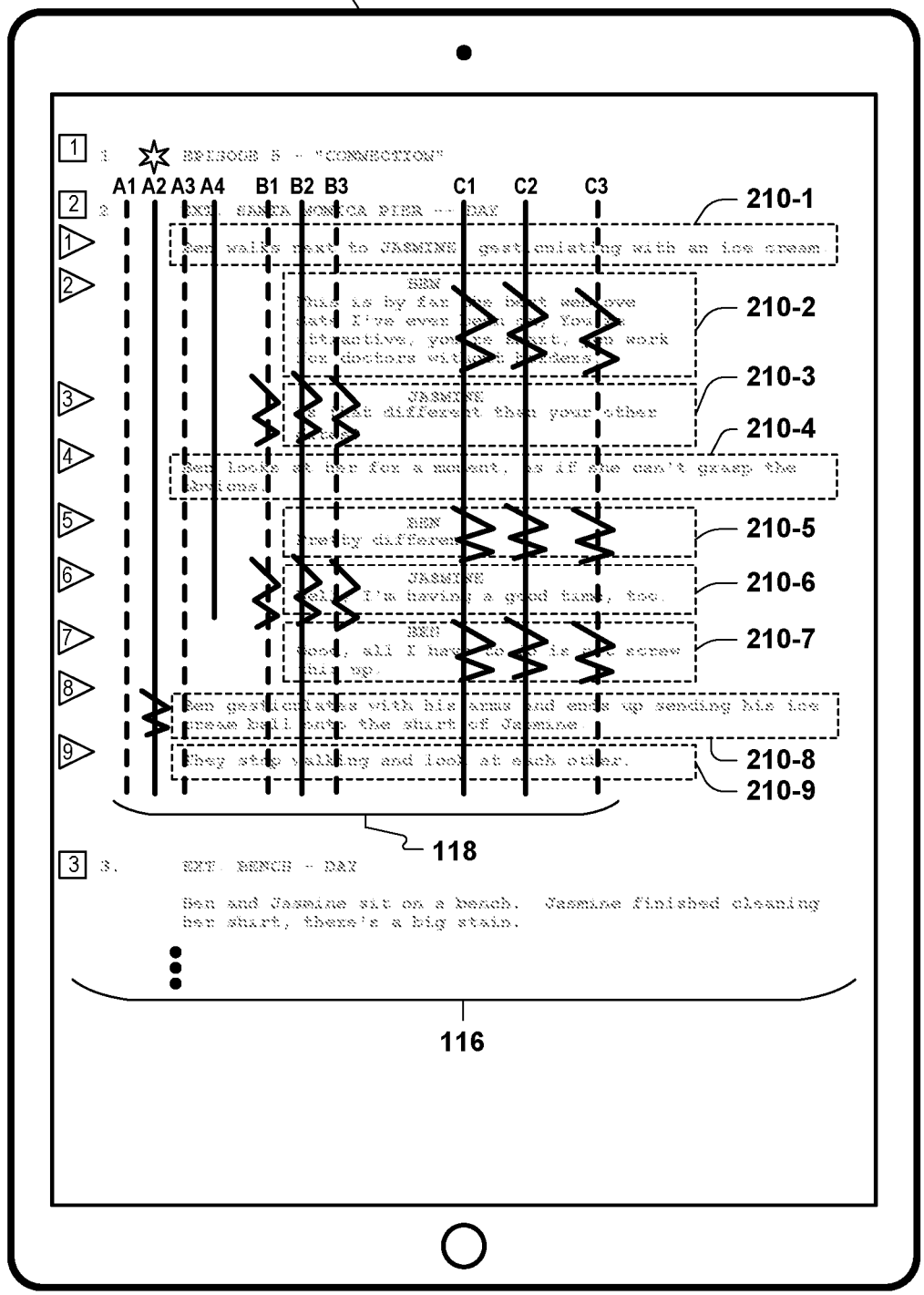
FIGS. 2A and 2B are diagrams of an example implementation, according to some example embodiments.
Figure 2B:
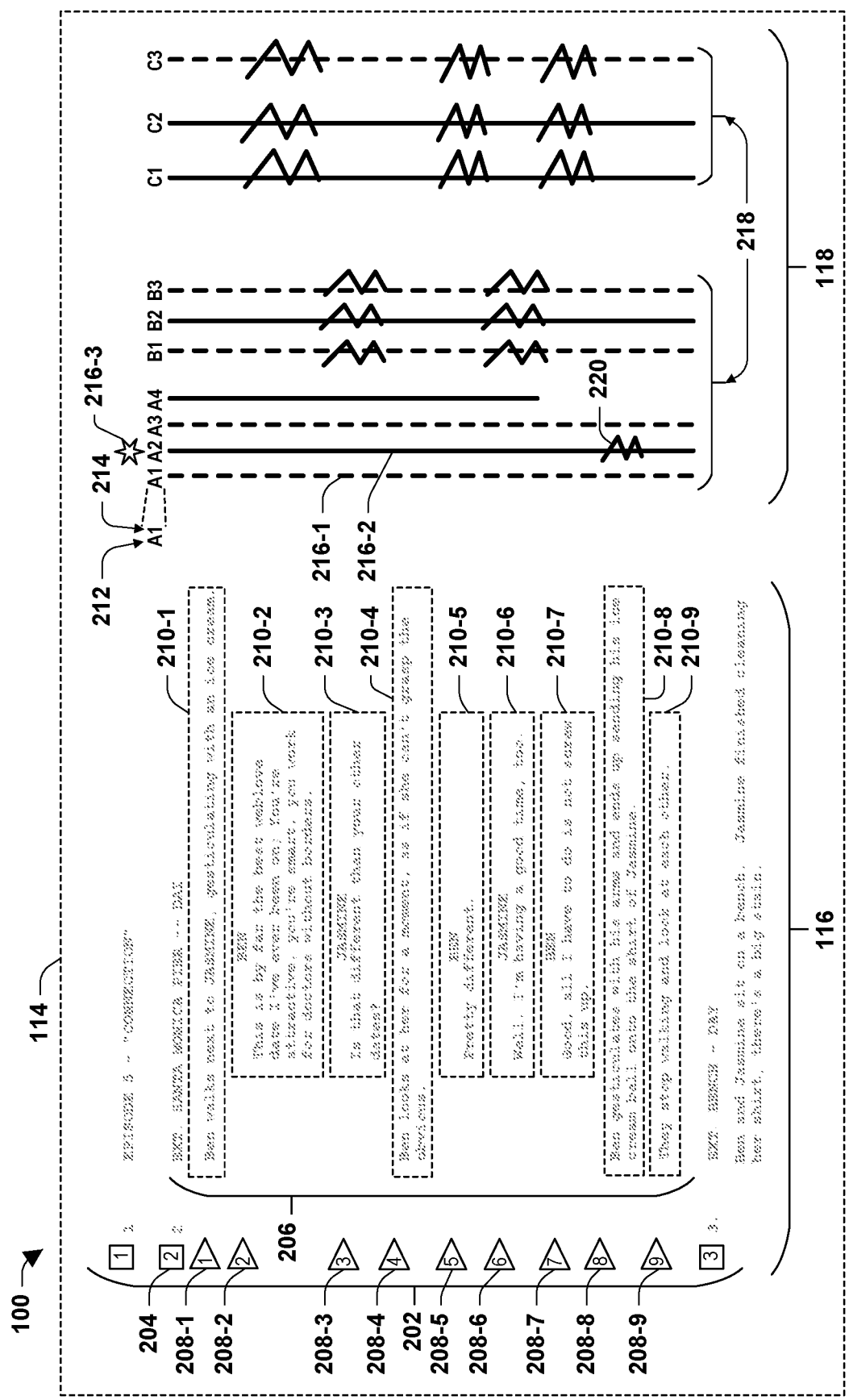

FIGS. 2A and 2B are illustrations of the example implementation 100 including the user device 114, the script 116, and the metadata 118, according to some example embodiments. As shown in FIG. 2A, the user device 114 may be configured to display the script 116 and display the metadata 118 overlaying the script 116. As shown in FIG. 2B, the script 116 and the metadata 118 are shown separated for clarity. In some implementations, the script 116 may be an electronic document and the metadata 118 may be XML data that may be entered as an overlay to the script 116 during production.

In some implementations, the script 116 may include script elements 202 that index scenes of the script 116 and that index sections of each scene. As shown in FIG. 2B, the scene elements are represented by numbered rectangles. The scene elements may be alternatively presented on the user device 114 with other indicia, such as color, hash marks, etc., or may be transparent. In an example, the scene element 204 may correspond to the scene 206, which may be the second scene of the script 116 and may be visually represented by the numbered rectangle "2." The script elements 202 may include section elements 208, e.g., 208-1, 208-2, . . . , 208-*n*, that correspond to different sections of the script 116, e.g., sections 210-1, 210-2, . . . , 210-*n*. As shown in FIG. 2B, the section elements are represented by numbered triangles. The section elements may be alternatively presented on the user device 114 by other indicia, such as color, hash marks, etc., or may be transparent. In an example, the section element 208-2 corresponds to the section 210-2, which is the second section of the script 116 and represented by the numbered triangle 2. As shown in FIG. 2B, the scene 206 may include nine sections, which are visually represented by nine numbered triangles.

In some implementations, the metadata 118 may correspond to user input to the user device 114. The metadata 118 may include shot metadata 212 that identifies a shot of the rendition 104, take metadata 214 that identifies each take associated with each shot, and quality metadata 216 that identifies a quality parameter associated with each take. By convention and as shown in FIG. 2B, the shot metadata 212 may be associated with sequential letters and the take metadata 214 may be associated with sequential numbers, grouped together above each vertical line overlaying the script 116. In some implementations, a take may be indicated by the shot metadata 212 and the take metadata 214 grouped together. For example, shot A, take "4," may be indicated as take A4.

In some implementations, quality metadata 216 may indicate a user determined quality parameter associated with each take. As shown in FIG. 2B, quality metadata 216-1, indicating a bad take, may be represented by a dashed line in FIG. 2B. The quality metadata 216-1 may be alternatively presented on the user device 114 by other indicia, such as color (e.g., a solid red line), a letter "B," etc. Quality metadata 216-2, indicating a good take, may be visually represented by a solid line. The quality metadata 216-2 may be alternatively presented on the user device 114 by other indicia, such as color (e.g., a solid green line), a letter "G," etc. In some implementations, quality metadata 216-2 may be indicated by the absence of visual indicia. Quality metadata 216-3, indicating a best take, may be visually represented by a star above a vertical line overlaying the script 116. The quality metadata 216-3 may be presented on user device 114 by other indicia, such as color (e.g., a solid gold line), a circled line, etc. In some implementations, the metadata 118 may include multiple bad takes, multiple good takes, or multiple best takes. In some implementations, the absence of the quality metadata 216 associated with a take may be interpreted as a good take.

In some implementations, the metadata 118 may include line metadata 218, which may be visually indicated as vertical lines overlaying the script 116. The line metadata 218 may indicate portions of the scene 206 rendered and captured in a media asset. For example, the scene 206 may be cut prior to completion of take A4, thereby completing sections 210-1 to 210-6 of the script 116 for take A4. In this case, the media asset A4 may capture the rendition 104 corresponding to sections 210-1 to 210-6 of the script 116. In some implementations, the metadata 118 may include strike metadata, such as strike metadata 220, visually indicated as twisting or "squiggly" lines overlaying the script 116. The strike metadata 220 may indicate that a corresponding section of the script 116 should be excluded from a media composition. In some implementations, the strike metadata 220 may indicate that an actor associated with a section of the script 116 is off camera. For example, during the rendition 104, shot A may be associated with a wide shot capturing the actor B ("BEN") and the actor J ("JASMINE"), shot B may be associated with a close-up shot of actor B, and shot C may be associated with a close-up shot of actor J. In this example, all takes of shot B, e.g., B1, B2, and B3, include strike metadata 220 over sections 210-3 and 210-6 of the script 116 indicating that actor J is off camera and that segments of media assets B1, B2, and B3 corresponding to the sections 210-3 and 210-6 should be excluded from a media composition. In some implementations, the strike metadata 220 may indicate that a flaw may be present in a portion of a take. For example, take A2 may be indicated by quality metadata 216-3 as a best take and includes the strike metadata 220 corresponding to section 210-8 of the script 116. In some implementations, a segment of the media asset A2 corresponding to section 210-8 may be excluded from weighted processing by the editing device, as set forth below, and may be excluded from a media composition. In some implementations, a segment of the media asset A2 corresponding to section 210-8 may be included in weighted processing by the editing device, as set forth below, but may receive a low score due to inclusion of a weighted parameter corresponding to the strike metadata 220, and hence may be excluded from a media composition. As indicated above, FIGS. 2A and 2B are provided merely as examples. Other arrangements and/or configurations for comparing the segments of the media assets 106, the script elements 202, and the metadata 118 are within the scope of the present disclosure.

Figure 3:
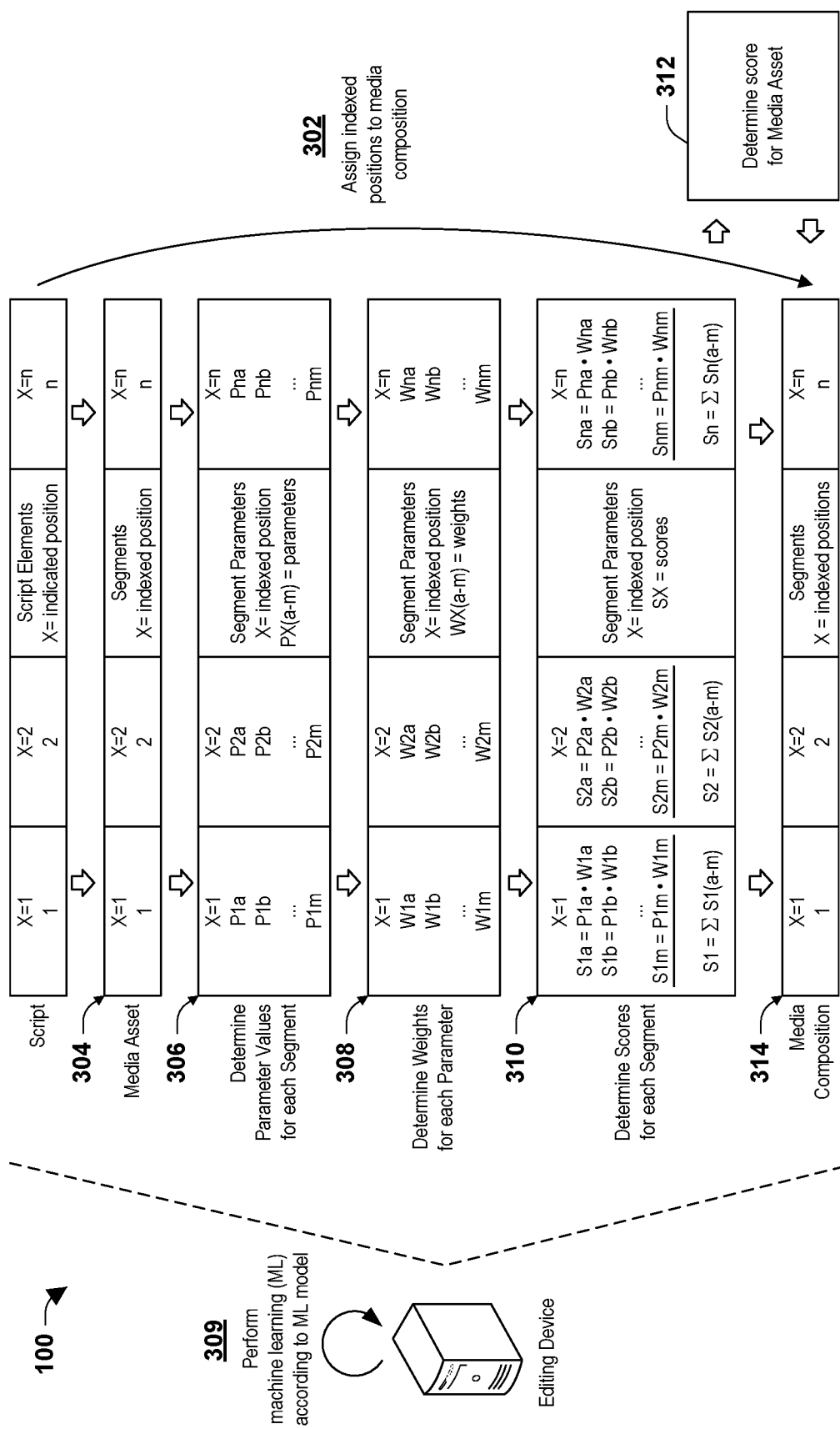
FIG. 3 is a diagram of an example implementation in which a media composition is edited, according to some example embodiments.

FIG. 3 illustrates the example implementation 100 in which a media composition is edited with indexed segments of a media asset, according to some example embodiments. As shown in FIG. 3, and by reference number 302, the editing device may assign indexed positions to the media composition. In some implementations, the editing device may assign indexed positions corresponding to the script elements 202 of the script 116. In some implementations, the editing device may extract indexed positions from the script 116 based upon a textual analysis of the script. For example, the editing device may analyze textual indentation, paragraph spacing, or keywords, and assign indexed positions based on the analysis. Examples of keywords include a character name, such as "BEN," or a predetermined keyword, such as "EXT.," to identify a scene. In some implementations, and by reference number 304, the editing device may receive a media asset associated with a scene to be rendered in a media composition. The editing device may determine segments of a media asset and may assign indexed positions to the segments of the media asset based on a comparison of the segments of the media asset and the script elements. The indexed positions in the media asset may correspond to the indexed positions in the media composition.

In some implementations, the editing device may determine the segments of the media asset by performing an audio analysis of the media asset. The editing device may perform the audio analysis through speech-to-text conversion of an audio portion of the media asset. The editing device may then compare the converted text to text within the sections 210 of the script 116 containing dialogue, e.g., sections 210-2, 210-3, 210-5, 201-6, and 210-7. For example, the media asset may include an audio portion corresponding to spoken dialogue by BEN and JASMINE in section 210-3 (i.e., where JASMINE states "Is that different than your other dates?"), which may be converted to text and detected. The editing device may add a time stamp to the detected portion of the media asset and assign the segment position X=3, corresponding to section element 208-3 and section 210-3 of the script 116. In another example, the editing device may process the data and detect audio portions corresponding to sections 210-3 and 210-5 of the script 116, where section 210-4 does not contain dialogue. The editing device may add a time stamp of the detected audio portions of a media asset, assign corresponding segment positions X=3 and X=5, and then assign the segment position X=4 to the gap in detected audio segments X=3 and X=5. In some implementations, the editing device may assign a minimum time dependent buffer to a time stamped beginning (e.g., a beginning buffer) and/or a time stamped end (e.g., an end buffer) of a detected segment. For example, in segment X=3, the editing device may assign a 0.5 second (s) buffer to a time stamped beginning of the segment X=3 and may assign a 1.0 s buffer to a time stamped end of the segment X=3. In some implementations, the beginning buffer may be set with a Beginning Buffer Parameter (BBP) and the end buffer may be set with an Ending Buffer Parameter (EBP), which may be user selected or determined by the editing device with a machine learning model.

In some implementations, the indexed segments of a media asset are continuous such that no time gaps may be present between indexed segments. In some implementations, the indexed segments of a media asset are discontinuous such that time gaps may be present between indexed segments. Other arrangements and/or configurations for forming the segments of a media asset and/or assigning indexed positions to the segments are within the scope of the present disclosure.

In some implementations, and by reference number 306, the editing device may determine one or more parameter values PX(a-m) associated with each indexed segment, where "a" indicates a first determined parameter, "m" indicates a last parameter, and "X" identifies the segment by indexed position. For example, parameter value P1a may be associated with the determined parameter "a," associated with the indexed segment "1." The parameters may include one or more visual parameters indicating a visual quality value of the indexed segment and/or one or more audio parameters indicating an audio quality value of the indexed segment.

In some implementations, the visual parameters may include a Focus Parameter (FP) determined from a focus analysis of a video portion of an indexed segment. In some implementations, the focus analysis may be performed by comparing an edge of an object in the video portion of the indexed segment with a background in the video portion of the indexed segment. The FP may have, for example, a value: of 1—Too Soft; 2—Passable (Some Softness); or 3—Clear Focus. In some implementations, the visual parameters may include a Steadiness Parameter (SP) determined from a camera steadiness analysis of a video portion of an indexed segment. The camera steadiness analysis may be performed by comparing a position of an object in the video portion of the indexed segment with one or more previous positions of the object over a unit of time. The SP may have, for example, a value of: 1—Too Shaky; 2—Passable (Some Smoothness); or 3—Steady. In some implementations, the visual parameters may include an On Camera Parameter (OCP) determined from a speaker-on-camera analysis of a video portion of an indexed segment. The speaker-on-camera analysis may be determined by detecting presence of a speaker through facial recognition, and correlating movement of facial features of the detected speaker with an audio portion of the indexed segment over a unit of time. In some implementations, the speaker-on-camera analysis may also detect framing of the detected speaker within a predetermined border of the video portion of the indexed segment. The OCP may have, for example, a value of: 1—Off Camera; 2—Passable (cross margin); or 3—On Camera (within margin). Other arrangements and/or configurations of the visual parameters, for determining the visual parameters, and/or for assigning values to the visual parameters are within the scope of the present disclosure.

In some implementations, the audio parameters may include a Script Continuity Parameter (SCP) determined from a script continuity analysis of an audio portion of an indexed segment. The script continuity analysis may be determined by performing speech-to-text conversion of an audio portion of the media asset and then comparing the converted text to the sections 210 of the script 116 containing text dialogue. For example, as shown by FIG. 2B, sections 210-2, 210-3, 210-5, 210-6, and 210-7 of the script 116 may include text dialogue. The SCP may have, for example, a value of: 1—Adlib; 2—Passable; or 3—Word for Word. In some implementations, the audio parameters may include a Dialogue Clarity Parameter (DCP) determined from a dialogue clarity analysis of an audio portion of an indexed segment. In some implementations, the dialogue clarity analysis may be determined through natural language processing of an audio portion of the indexed segment and may produce a certainty percentage (%) associated with the indexed segment. For example, the dialogue clarity analysis may analyze an audio portion of the indexed segment using a trained ML model, where the ML model has been trained with historical spoken language obtained from one or more source audio files. For example, a character may require a "Boston" accent characterized by a soft "a" sound, e.g., "Get the car" may be pronounced "Get the ca." In this example, the ML model may be trained with one or more source audio files of dialogue spoken with a Boston accent. The DCP may have, for example, a value of: 1—No pass (CP<70%); 2—Passable (71%<CP<90%); or 3—Word for Word (CP>90%). In some implementations, the machine learning model may be trained with segments of historical media assets, where each of the historical media assets may include an associated historical visual parameter and an associated historical audio parameter. In some implementations, the machine learning model may be trained with historical visual parameters and historical audio parameters associated with segments of historical media assets. Other arrangements and/or configurations of the audio parameters, for determining the audio parameters, and/or for assigning values to the audio parameters are within the scope of the present disclosure.

In some implementations, other parameters may be applied and/or assigned to an indexed segment of a media asset, such as a Take Quality Parameter (TQP) associated of a media asset. A TQP may be determined from the metadata 118 and may be associated with a user input specifying a user input quality of the media asset. For example, the quality metadata 216 may include the quality metadata 216-1 indicating a bad take; the quality metadata 216-2 indicating a good take; or the quality metadata 216-3 indicating a best take. The TQP may have, for example, a value of: 1—Bad Take (corresponding to the quality metadata 216-1); 2—Good Take (corresponding to the quality metadata 216-2); or 3—Best Take (corresponding to the quality metadata 216-3).

In some implementations, some parameters may be determined and/or processed at different times for a media asset and/or segments of a media asset. For example, the TQP may be determined and/or assigned to a media asset and/or segments of the media asset upon receipt of the metadata 118 and upon receipt of a portion of the media asset by the editing device. In another example, the SCP may be determined during assignment of indexed positions to the media asset, as shown by reference number 304. Other arrangements and/or configurations for determining and/or processing the parameters of a media asset and/or at different times are within the scope of the present disclosure.

In some implementations, and by reference number 308, the editing device may determine one or more weights WX(a-m) associated with each indexed segment, where "a" indicates a first determined weight, "m" indicates a last determined weight, and "X" identifies the segment by indexed position. For example, weight W1a may be associated with the determined weight "a" associated with indexed segment "1." The weights may be determined from a trained ML model and may include one or more visual parameters indicating a visual quality value of the indexed segment and/or one or more audio parameters indicating an audio quality value of the indexed segment. The editing device may use ML to determine the weights for each parameter of a segment. For example, the ML model may have been trained based on a training data set that includes combinations of historic parameters corresponding to different segments, different groups of segments, different media assets, and/or different groups of media assets. The training data set may include corresponding scores for the historic parameters. In this case, the editing device may process the segments of a media asset using the trained ML model to determine the weights. In some implementations, the media assets or different groups of media assets may be associated with the same production. For example, a production may include hundreds of scenes, and during partial production, a number of processed media compositions associated with produced scenes may be used as the training data set. In some implementations, the training data set may include media assets associated with a director, a genre of cinematic production, prior productions in a series, etc. In some implementations, the editing device may use scores to select a segment or a media asset for inclusion in a media composition, as described in more detail elsewhere herein.

In some implementations, and by reference number 309, the editing device may perform machine learning according to a machine learning model. The machine learning model may include one or more of an exploratory factor analysis model, a confirmatory factor analysis model, a principal component analysis model, a k-means clustering model, a least absolute shrinkage and selection operator (Lasso) regression analysis model, an artificial neural network model, non-linear regression model, decision tree model, a fuzzy logic model, and/or another model.

In some implementations, the exploratory factor analysis model may include a statistical model used to uncover an underlying structure of a relatively large set of variables. For example, the exploratory factor analysis model may perform a factor analysis technique to identify underlying relationships between measured variables. Measured variables may include any one of several parameters, such as the parameters described herein.

In some implementations, the confirmatory factor analysis model may include a form of factor analysis that may be used to test whether measures of a construct are consistent with a preliminary conception of a nature of the construct. An objective of the confirmatory factor analysis model may be to test whether data fits a hypothesized measurement model that may be based on theory and/or previous analytic research.

In some implementations, the principal component analysis model may include a statistical procedure that uses an orthogonal transformation to convert a set of observations of possibly correlated variables into a set of values of linearly uncorrelated variables called principal components. A number of distinct principal components may be equal to a smaller of a number of original variables or a number of observations minus one. The orthogonal transformation may be defined in such a way that a first principal component has a largest possible variance, and each succeeding component in turn has a highest variance possible under a constraint that it may be orthogonal to preceding components. Resulting vectors may include an uncorrelated orthogonal basis set.

In some implementations, the k-means clustering model may be applied to partition (n) observations into (k) clusters in which each observation belongs to a cluster with a nearest mean, serving as a prototype of the cluster, which results in a partitioning of a data space into Voronoi cells. The k-means clustering model may utilize heuristic methods that converge quickly to a local optimum.

In some implementations, the Lasso regression analysis model may include a regression analysis model that performs both variable selection and regularization in order to enhance a prediction accuracy and interpretability of a statistical model that the Lasso regression analysis model produces. For example, the Lasso regression analysis model may include a shrinkage and selection model for linear regression, and may seek to obtain a subset of predictors that minimizes prediction error for a quantitative response variable. In some implementations, the Lasso regression analysis model may minimize a prediction error by imposing a constraint on model parameters that cause regression coefficients for some variables to shrink towards zero. Variables with a regression coefficient equal to zero after the shrinkage process may be excluded from the model, while variables with non-zero regression coefficient variables may be most strongly associated with the quantitative response variable.

In some implementations, the artificial neural network model may use an artificial neural network to perform machine learning. An artificial neural network may utilize a collection of connected units or nodes, also known as artificial neurons. Each connection between artificial neurons may transmit a signal from one artificial neuron to another artificial neuron. An artificial neuron that receives the signal may process the signal and then provide a signal to artificial neurons connected to the artificial neuron. In some artificial neural network implementations, the signal at a connection between artificial neurons may be a real number, and the output of each artificial neuron may be calculated by a non-linear function of the sum of its inputs. Artificial neurons and connections may have a weight that adjusts as learning proceeds. The weight may increase or decrease the strength of the signal at a connection. An artificial neuron may have a threshold such that the artificial neuron only sends a signal if the aggregate signal satisfies the threshold. Artificial neurons may be organized in layers, and different layers may perform different kinds of transformations on their inputs.

In some implementations, the non-linear regression model may apply non-linear regression analysis to perform machine learning. Non-linear regression may be a form of regression analysis in which observational data are modeled by a function which may be a non-linear combination of the model parameters and depends on one or more independent variables. The observational data may be fitted by successive approximations. The non-linear function may be, for example, an exponential function, a logarithmic function, a trigonometric function, a power function, a Gaussian function, and/or another function.

In some implementations, the decision tree model may use a decision tree data structure to perform machine learning. A decision tree data structure may classify a population into branch-like segments that form an inverted tree with a root node, internal nodes, and leaf nodes. For example, the decision tree learning model may use a decision tree as a predictive model to map observations about an item (represented in the branches of the tree data structure) to conclusions about the item target value (represented in the leaves of the tree data structure). Building a decision tree may include partitioning the data set into subsets, shortening of branches of the tree, and selecting a tree (e.g., the smallest tree) that fits the data. In some example implementations, a decision tree model may be a classification tree (where the target variable can take a discrete set of values) in which leaves represent class labels and branches represent conjunctions of features that lead to those class labels. In some example implementations, a decision tree model may be a regression tree (e.g., where the target variable can take continuous values, such as real numbers).

In some implementations, the fuzzy logic model may apply fuzzy logic to perform machine learning. Fuzzy logic may be a form of many-valued logic in which the truth values of variables may be any real number between zero and one. Fuzzy logic may be employed to represent the concept of partial truth, where the truth value may range between completely true and completely false, as opposed to Boolean logic, where the truth values of variables may only be the integer values zero or one, representing only absolute truth or absolute falseness. The fuzzy logic model may include variations of existing machine learning techniques in which fuzzy logic may be applied. Other arrangements, configurations, and/or implementations for performing the machine learning model are within the scope of the present disclosure.

In some implementations, and by reference number 310, the editing device may determine scores SX for each indexed segment where "X" identifies the segment by indexed position. In some implementations, the scores SX may be determined based on a sum "s" of weighted parameters SX(a-m) for each indexed position, where "a" indicates a first weighted parameter and "m" indicates a last weighted parameter associated with an indexed segment. In some implementations, each weighted parameter SX(a-m) may be based on a product of a parameter value PX(a-m) and a corresponding weight WX(a-m), as set forth above. For example, the score S1 of indexed segment "1" may be determined from a sum of all weighted parameters S1(a-m) of indexed segment "1." Other arrangements and/or configurations for determining the scores of each segment are within the scope of the present disclosure.

In some implementations, and by reference number 312, the editing device may determine a score SMA(id) for the media asset as a whole, where "id" identifies the media asset as described in more detail elsewhere herein. In some implementations, the score SMA(id) may be determined based on a sum "s" of scores SX for each indexed segment associate with the media asset. In some implementations, the editing device may assign the media asset and the score of the media asset to a set of media assets, where each media asset in the set of media assets may include corresponding segments and may have a corresponding score. In some implementations, a score of the media asset, determined by the editing device and using the machine learning model, may be based on a compilation of one or more weighted parameters respectively corresponding to segments of the media asset. The editing device may then select a media asset from the set of media assets based on the scores of the media assets. In some implementations, and by reference number 314, the editing device may then edit the media composition with segments of the selected media asset, as set forth by reference number 312, based on a comparison of the segments of the selected media asset and the script elements.

In some implementations, and by reference number 314, the editing device may assign each indexed segment and the score of each indexed segment, as set forth above by reference number 310, to a corresponding set of indexed segments, where each indexed segment in the corresponding set of indexed segments: may be indexed with the same indexed position, may be associated with a different media asset, and may have a corresponding score. The editing device may then select, for each indexed position of the media composition, an indexed segment from the set of indexed segments corresponding to the indexed position based on the scores of the indexed segments, and edit the media composition with the selected indexed segment for each indexed position. In some implementations, the editing device may transmit to the one or more communication devices 110 through the cellular wireless network the media composition after the editing of the media composition. In some implementations, the editing device may automatically transmit the media composition after the editing. Such automatic transmission may enable a user, located on set, to expeditiously review the media composition. In some implementations, the editing device may automatically transmit non-selected segments as alternate segments after transmission of the media composition. In some implementations and during editing of the media composition from a number of received media assets, one or more segments of the media composition may be edited with updated segments while remaining segments in the media composition remain unchanged. In this case, the editing device may transmit and/or automatically transmit the updated segments and the indexed position of the updated segments to the one or more communication devices for subsequent inclusion in a media composition. For example, the updated segments may be included in a media composition stored on a user device, e.g., the user device 114, connected to the one or more communication devices 110.

In some implementations, and by reference number 314, the editing device may select, as the selected indexed segment and from the set of indexed segments corresponding to the indexed position, the indexed segment with the highest score. In some implementations, and by reference number 314, the editing device may perform a segment editing and continuity analysis in the media composition. As multiple media assets are received by the editing device, as set forth above with reference to FIG. 1, multiple media assets may be indexed, scored, stored, and/or edited into the media composition. If two media assets associated with the same shot, e.g., B2 and B3 set forth above with reference to FIG. 2B, have segments with close scores and a highest scoring segment is always selected, the media composition may flicker between segments from the two media assets. Such flicker may be observed as a discontinuity due to minor variations in position of actors, objects, etc. In some implementations, the editing device may analyze the position of each of the indexed segments in the media composition and determine that an indexed segment having a highest score may not be in the media composition. Before editing the indexed position with the highest scoring segment, the editing device may analyze the media composition to determine a segment having an immediately preceding indexed position. The editing device may then determine a media asset associated with the determined indexed segment (i.e., a media asset of the immediately preceding indexed segment). The editing device may then select, as a selected indexed segment and from a set of indexed segments corresponding to the indexed position, an associated indexed segment associated with the determined media asset when the associated indexed segment is within a threshold value (TH) of the indexed segment with the highest score. In other words, the editing device may retain a sequential train of segments associated with the same media asset (e.g., B2) unless a score of a segment for an indexed position exceeds the currently indexed segment by the threshold value (e.g., a segment from B3). If the threshold value is exceeded, the indexed segment may be replaced and subsequent segments in the sequential train may also be edited to include segments from the same media asset (e.g., B3). In this way, flicker between closely scoring media assets may be reduced and continuity may be improved. In some implementations, the threshold value TH may be a predetermined value, such as a percentage (%) of the segment with the highest score for the indexed position. For example, the threshold value TH may be 20% of the highest score for the indexed position.

In some implementations, the editing device may apply a weight to a visual parameter to obtain a weighted visual parameter and may apply a weight to an audio parameter to obtain a weighted audio parameter, as set forth above by reference number 310. The editing device may then compile the weighted visual parameter and the weighted audio parameter to obtain the score. The editing device may then assign, for each segment in the media asset, the segment to at least one of a first set of segments or a second set of segments, based on the score of the segment. The editing device may then edit the media composition, as set forth above by reference number 314, with the first set of segments.

In some implementations, and by reference number 314, the editing device may analyze the metadata 118 to detect a presence of strikethrough information, such as the strike metadata 220, associated with an indexed segment. The strikethrough information may specify a segment to be excluded from the media composition, as set forth above. The editing device may then edit each indexed position of the media composition with an indexed segment that may not be associated with the strikethrough information.

In some implementations, and by reference number 304, the editing device may receive the media asset as a first media asset identified as a first take associated with a first shot of a scene (e.g., take A1). The editing device may receive a second media asset associated with the scene to be rendered in the media composition. The editing device may index segments of the second media asset with the indexed positions of the media composition based on a comparison of the segments of the second media asset and the script elements 202. In some implementations, and by reference number 310, the editing device may determine, with the ML model, a score of each indexed segment of the second media asset based on one or more corresponding weighted parameters. In some implementations, and by reference number 314, the editing device may assign and for each segment in the first media asset and the second media asset, the segment to at least one of a first set of segments or a second set of segments, based on the score of the segment, as set forth above. The editing device may then edit the media composition with the first set of segments. In some implementations, the second media asset may be identified as a second take associated with the first shot of the scene (e.g., take A2). In some implementations, the second media asset may be identified as a first take associated with a second shot of the scene (e.g., take B1). In some implementations, the second set of segments may be identified as alternate segments to the media composition. A user, such as a director, may benefit from review of the alternate segments. In some implementations, the second set of segments may be transmitted by the editing device to the one or more communication devices 110 through the cellular wireless network after transmitting the media composition. In some implementations, the second set of segments may be automatically transmitted after transmitting the media composition. Such automatic transmission may enable a user, such as a director located on set, to expeditiously review the second set of segments as alternate segments. Other arrangements and/or configurations for editing the media composition are within the scope of the present disclosure.

Figure 4:
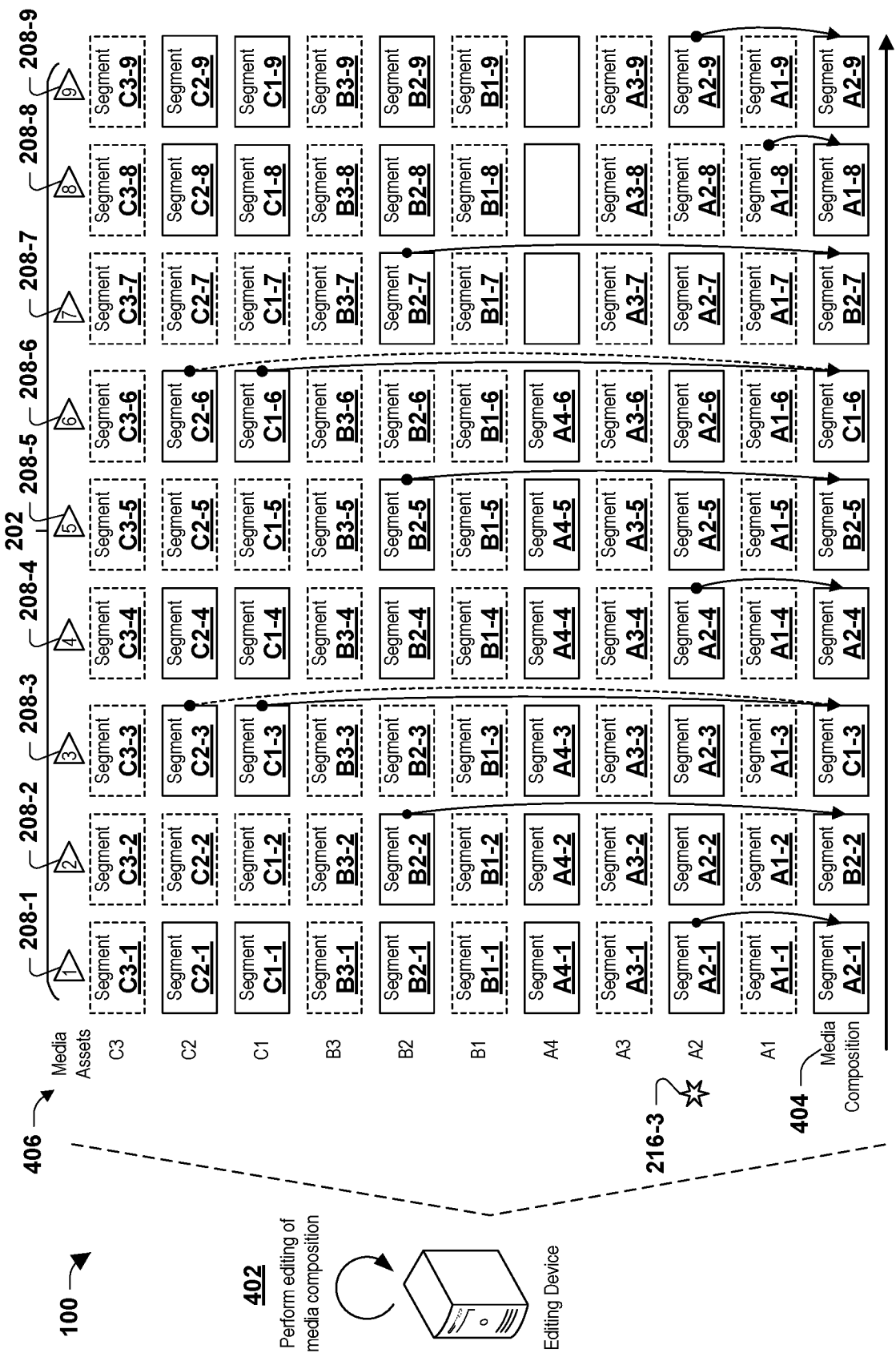
FIG. 4 is a diagram of an example implementation in which a media composition is edited, according to some example embodiments.

FIG. 4 is a diagram illustrating the example implementation 100 in which a media composition is edited from media assets, according to some example embodiments. As shown in FIG. 4, and by reference number 402, the editing device may perform editing of a media composition 404 from segments of media assets identified as takes of the rendered scene 206 set forth above with reference to FIGS. 2A and 2B. Table 406 illustrates the segments of the media assets as horizontal rows, where each column may identify a segment associated with script elements 202 and section elements 208-(1-9) of the script 116. Each box in the table 406 may include a segment identifier. For example, media asset A1 may include a segment identifier A1-1, which may correspond to the section element 208-1 (i.e., represented by numbered triangle "1"). Solid boxes surrounding segment identifiers may indicate that the metadata 118 has identified the segment as a best take (e.g., quality metadata 216-3 indicating a best take; TQP=3) or a good take (e.g., line metadata 218 corresponding to quality metadata 216-2 indicating a good take; TQP=2). Dashed boxes surrounding segment identifiers may indicate that the metadata 118 has identified the segment as a bad take (e.g., line metadata 218 corresponding to quality metadata 216-1 indicating a bad take; TQP=1) or that the strike metadata 220 has identified the segment as off camera and/or containing a flaw. For example and with reference to FIGS. 2A and 2B set forth above, media composition 404 may include nine indexed positions corresponding to the script elements 202, e.g., the numbered section elements 208-(1-9).

In some implementations, and by way of example, indexed position 1 of the media composition 404 may be edited with segment A2-1, corresponding to shot "A," take "2" because no dialogue is present and/or take A2 is indicated as a best take by the quality metadata 216-3. Indexed position "2" may be edited with segment B2-2 because the editing device may have determined, for example, that BEN is speaking dialogue associated with section 210-3 of the script 116 and/or because strike metadata may be associated with takes C1, C2, and C3. Indexed position "3" may be edited with segment C1-3 because JASMINE is speaking dialogue associated with section 210-3 of the script 116 and/or because the line metadata 218 may indicate that take C1 is a good take (e.g., corresponding to TQP=2). Segment C2-3 may also be associated with spoken dialogue of JASMINE and may be indicated by line metadata 218 as a good take. In this case, the editing device may have performed a weighted parameter analysis between segment C1-3 and C2-3 and selected C1-3 (e.g., because C1-3 has a higher score). Indexed position "4" may be edited with segment A2-4 because take A2 is indicated as a best take by the quality metadata 216-3. Indexed position "5" may be edited with segment B2-5 because BEN is speaking dialogue associated with section 210-5 of the script 116 and/or because the strike metadata 220 may be associated with takes C1, C2, and C3. Indexed position "6" may be edited with segment C1-6 for the above reasons as indexed position "3," and indexed position "7" may be edited with segment B2-7 for the above reasons as indexed position "5." Indexed position "8" may be edited with segment A1-8 because no dialogue is detected and/or because segment A2-8 (e.g., associated with best take A2) is associated with the strike metadata 220. In this case there may be an absence of segments associated with shot "A" that are indicated by line metadata 218 as a best take or good take, and that do not include strikethrough information indicated by strike metadata 220. Accordingly and by way of example, the editing device may have performed a weighted parameter analysis between segments A1-8 and A3-8, both of which are indicated as bad takes by way of dashed boxes, and selected A1-8 (e.g., because A1-8 has a higher score). Indexed position "9" may be edited with segment A2-9 because take A2 is identified as a best take. Segments identified in the table 406 that were not selected for inclusion in the media composition 404 may be identified as alternate segments, as described in more detail elsewhere herein. Other arrangements and/or configurations for editing the media composition 404 with the editing device are within the scope of the present disclosure.

Figure 5:
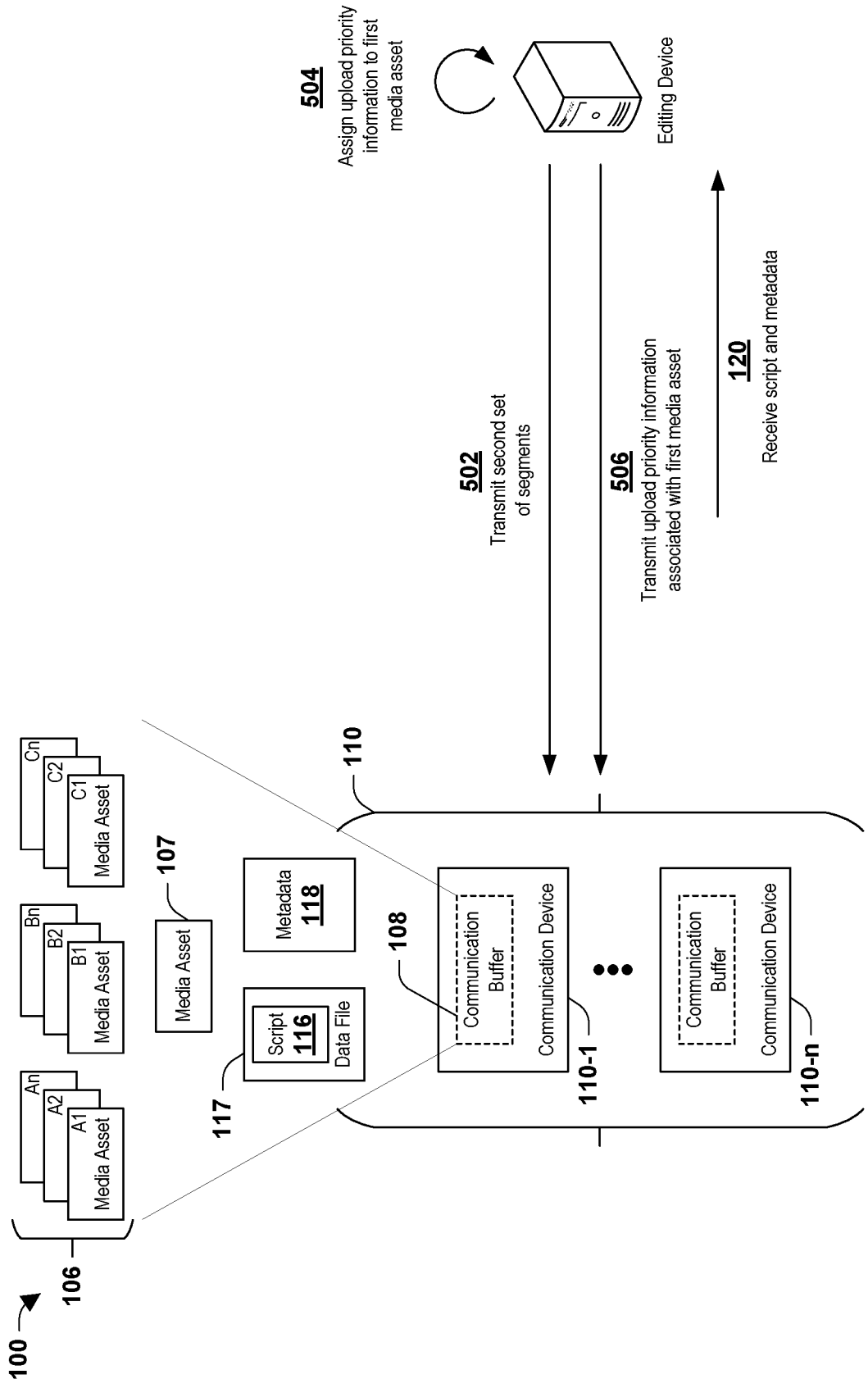
FIG. 5 is a diagram of an example implementation of communicating of a media asset, according to some example embodiments.

FIG. 5 is a diagram illustrating the example implementation 100, according to some example embodiments. As shown in FIG. 5, and by reference number 502, the editing device may transmit a second set of segments to the one or more communication devices 110 through the cellular wireless network after transmitting the media composition 404. In some implementations, the second set of segments may be the alternate segments, as described in more detail elsewhere herein, which were not included in the media composition 404. As shown in FIG. 5, and by reference number 504, the editing device may determine a parameter associated with a first media asset, as set forth above. For example, the editing device may receive the metadata 118 (e.g., the quality metadata 216-3) indicating a bad take during partial upload of a first media asset. The editing device may then assign TQP=1 to the first media asset and then assign upload priority information (e.g., an Upload Priority Parameter (UPP)) with a value UPP=1 to the first media asset. As show in FIG. 5, and by reference number 506, the editing device may then transmit the upload priority information to the one or more communication devices 110. The upload priority information may then be used by the one or more communication devices 110 to assign priority of transmission the first media asset in the communication buffer 108. For example, the upload priority information may cause the one or more communication devices 110 to stop transmission of the first media asset and to initiate transmission of a next media asset in the communication buffer 108. Other arrangements and/or configurations for determining priority of transmission of are within the scope of the present disclosure.

FIGS. 6A-6E are a flow chart of an example method 600, according to some example embodiments. In some implementations and at 602, a media asset and metadata associated with the media asset may be received into a queue of the editing device for processing. At 604, the editing device may assign a Take Quality Parameter (TQP) to the media asset from the metadata 118, where the TQP may indicate whether the media asset may be a bad take (TQP=1), a good take (TQP=2), or a best take (TQP=3). At 606, the editing device may perform a decision based on a value of the TQP. At 606, the editing device may determine a value of TQP=1, indicating a bad take, and then flow may proceed to 608, where a value of UPP=1 may be assigned to the media asset indicating a low priority for upload. Following 608 and at 610, the UPP assigned to the media asset may be transmitted to the one or more communication devices 110, and flow may proceed to 616. In response to 610 and receipt of the assigned UPP having the value UPP=1, the one or more communication devices 110 may provide a low priority to an upload of the corresponding media asset in the communication buffer 108. At 606, the editing device may determine a value of TQP=3, indicating a best take, and then flow may proceed to 612, where a value of UPP=3 may be assigned to the media asset indicating a high priority for upload. Following 612 and at 614, the UPP assigned to the media asset may be transmitted to the one or more communication devices 110, and flow may proceed to 616. In response to 614 and receipt of the assigned UPP having the value UPP=3, the one or more communication devices 110 may provide a high priority to an upload of the corresponding media asset in the communication buffer 108. At 606, the editing device may determine a value of TQP=2, indicating a good take, and then flow may proceed to 616, in some implementations, without transmission of a UPP. In some implementations, a UPP, such as a value of UPP=2, may not be transmitted to the one or more communication devices 110 because an indication of a good take may indicate sequential priority of upload in the communication buffer 108. In some implementations, the UPP may be changed at various stages of processing, such as upon tabulating parameters and applying a trained ML model at 620, as set forth below.

In some implementations, flow may include 615a and 615b between 606 and 616. At 606, the editing device may determine a value of TQP=2, indicating a good take, and then flow may proceed to 615a, where a value of UPP=2 may be assigned to the media asset indicating a sequential priority for upload. Following 615a and at 615b, the UPP assigned to the media asset may be transmitted to the one or more communication devices 110, and flow may proceed to 616. In response to 615b and receipt of the assigned UPP having the value UPP=2, the one or more communication devices 110 may provide a sequential priority to an upload of the corresponding media asset in the communication buffer 108 such that the media asset may remain in an input sequential position as received into the communication buffer 108. After the UPP has been assigned and transmitted, as set forth above and in some implementations, flow may proceed to 616. At 616, based on a comparison with the script 116 and the metadata 118, the media asset may be parsed into indexed segments and the media asset may be assigned to a shot (e.g., shot A, shot B, shot C, etc.), as described in more detail elsewhere herein.

In some implementations and at 618, parameter analysis may be conducted for each indexed segment to obtain corresponding parameters, as described in more detail below with reference to FIG. 6C. Flow may then proceed to 620, where the parameters for each indexed segment may be tabulated and a trained ML model may be applied to the parameters. In some implementations and at 620, a score may be determined for each parameter of each indexed segment, a score may be determined for each segment of the media asset, and a score may be determined for the media asset. At 622 and in some implementations, the score of the media asset may be compared with scores of other media assets associated with a shot. At 622, if the score of the media asset is not the highest score of a media asset associated with the shot, flow may proceed to 624, where a media composition parameter (MCP) may be assigned to all segments of the media asset, i.e., a value of MCP=2, designating all segments as alternate segments of the media composition. At 622, if the score of the media asset is the highest score of a media asset associated with the shot, flow may proceed to 626, where a value of MCP=3 may be assigned to all segments of the media asset, designating all segments as members of the media composition. The combination of 616, 622, 624, and 626 may provide, at this stage of the flow, that segments of a media asset with the highest score associated with a shot are designated for editing into associated indexed positions of the media composition. For example and as illustrated in FIG. 2B, media assets associated with the shot A are associated with sections 210-1, 210-4, 210-8, and 210-9 of the script 116. In this example, the media asset A2 (i.e., corresponding to take A2) is indicated by the quality metadata 216-3 as a best take of all media assets for the shot A (i.e., media assets A1, A2, A3, and A4), and therefore media asset A2 may receive the highest score. In this example and at this stage of the flow, the segments A2-1, A2-4, A2-8 and A2-9 of the media asset A2 may be designated for editing into the media composition at indexed positions 1, 4, 8, and 9, respectively corresponding to sections 210-1, 210-4, 210-8, and 210-9 of the script 116. Designation of other segments of other media assets corresponding to shot A for editing into the media composition (e.g., segment A1-8 of the media asset A1 into the indexed position "8" of the media composition) may be performed subsequently based on associated scores and segment editing and continuity analysis, as forth in greater detail below. Flow may then proceed to marker A at 628, which is continued in FIG. 6B.

Figure 6A:
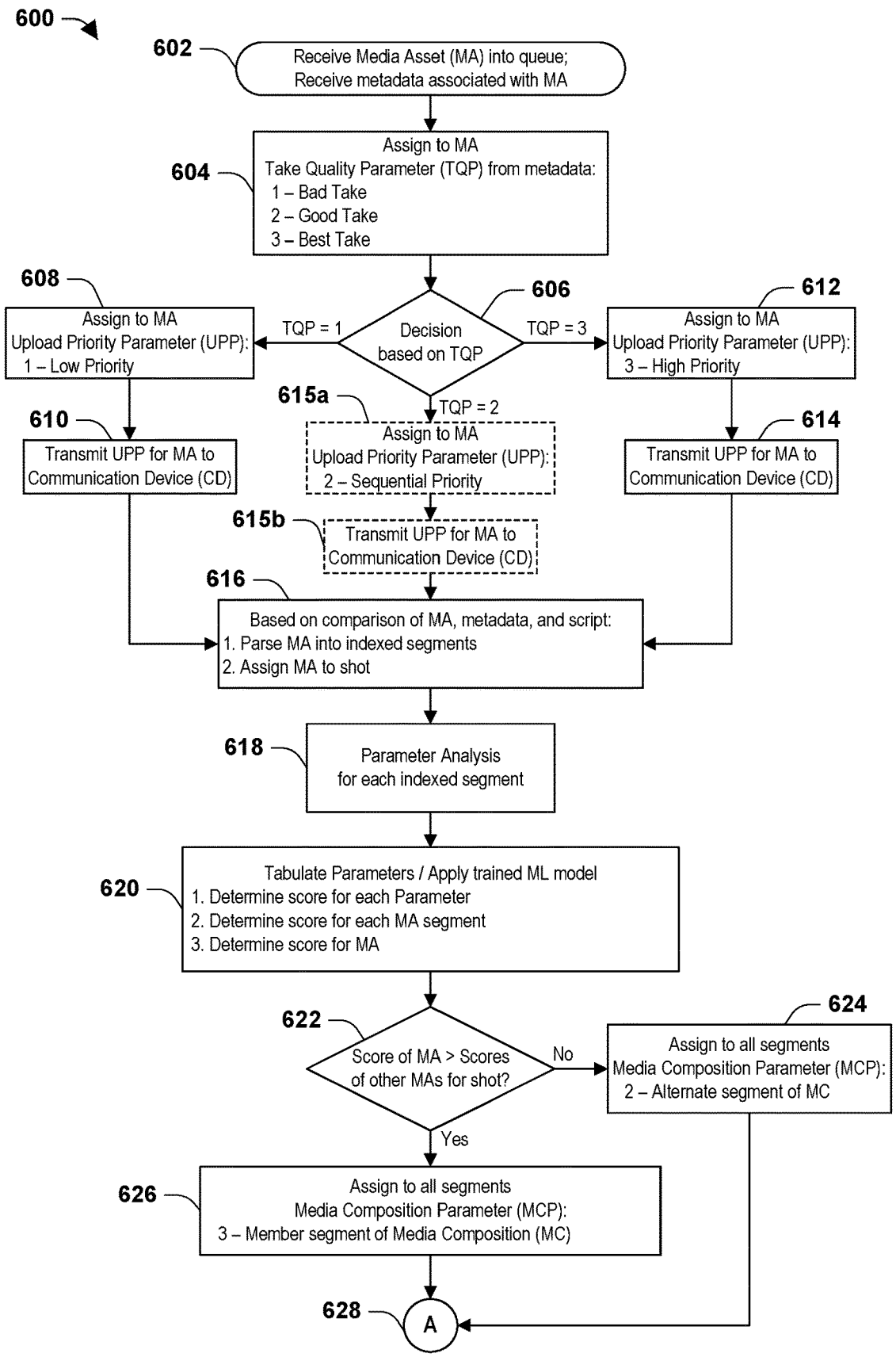
FIGS. 6A-6E are a flow chart of an example method, according to some example embodiments.
Figure 6B:
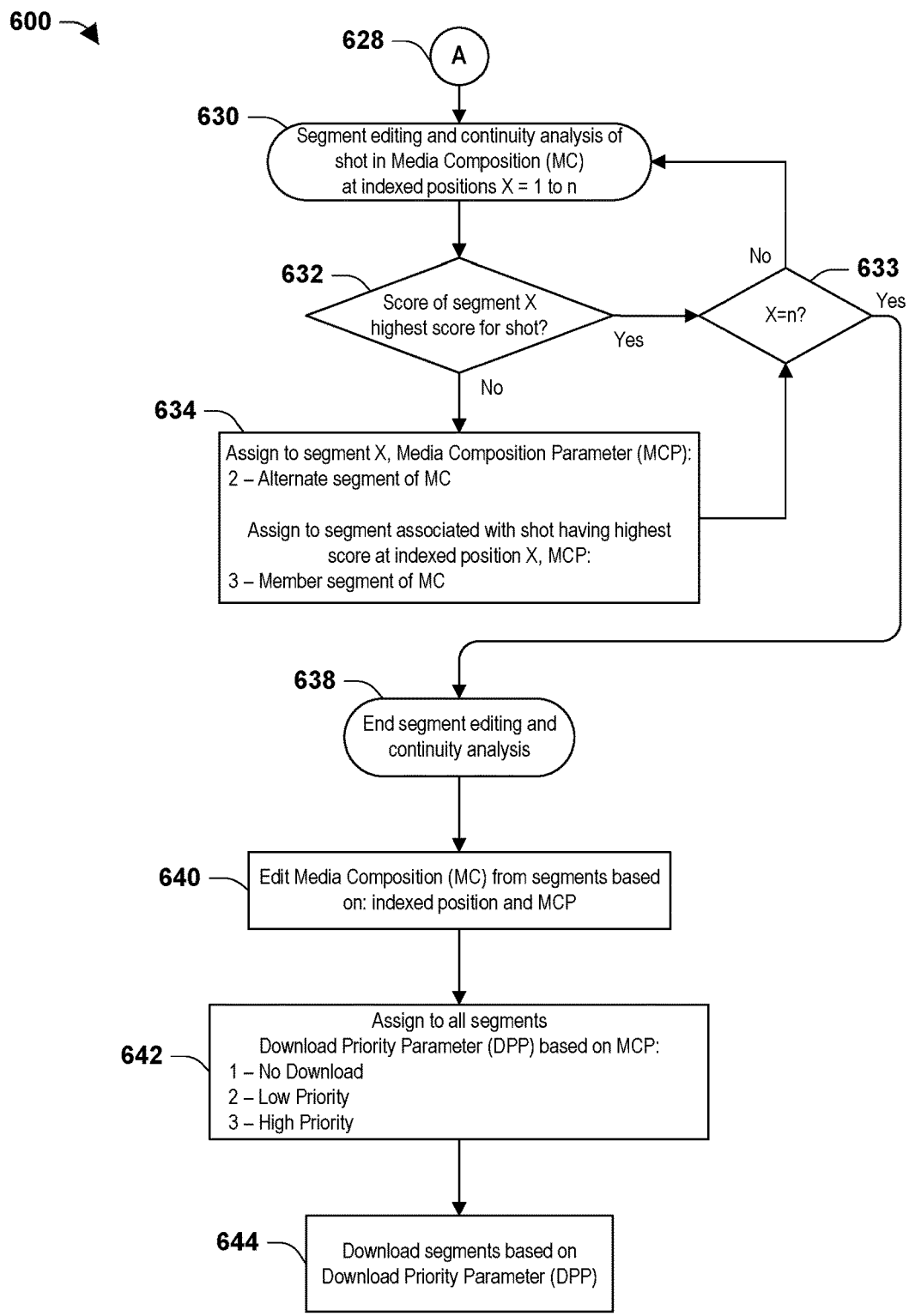

As shown in FIG. 6B, marker A at 628 continues the flow. In some implementations and at 630, segment editing and continuity analysis may be selectively performed. In some implementations, segment editing and continuity analysis may be selected and/or initiated by way of a graphical user interface (GUI) (not shown) that is communicatively coupled to the editing device. For example, when segment editing and continuity analysis may not be selected, segments of the media asset with the highest score associated with a shot may be edited into the media composition based on indexed positions of the associated segments, e.g., at 640 as set forth below. In this example, segments of media assets with lower scores may be downloaded as alternate segments, e.g., at 644, for selective editing into the media composition by an end user, such as director on set. In some implementations, segment editing and continuity analysis may be automatically performed. In some implementations, additionally and/or alternatively, segment editing and continuity analysis may be performed as set forth in greater detail elsewhere herein.

In some implementations and at 630, segment editing and continuity analysis in the media composition may be performed for segments at indexed positions X=1 to n of the media composition. At 632, a determination may be made whether the score of the segment X (i.e., the segment in the indexed position X of the media composition) is the highest score for an associated shot in the indexed position. If affirmative, flow may proceed to 633, where a determination may be made whether the indexed position X is the last indexed position in the media composition, i.e., whether segment X=n. At 633, if the indexed position X is not the last indexed position in the media composition, flow may loop back to 630 for analysis of the next indexed position in the media composition. At 633, if the indexed position X is the last indexed position in the media composition, flow may proceed to 638, and segment editing and continuity analysis of the media composition may end.

In some implementations and at 632, if the score of the segment X is not the highest score for an associated shot, flow may proceed to 634, where a value of MCP=2 may be assigned to the segment X, to designate same as an alternate segment of the media composition. At 634, a value of MCP=3 may be assigned to the segment with the highest score for the indexed position X associated with the shot, to designate same as a member segment of the media composition. Flow may then proceed to 633, where a determination may be made whether the indexed position X is the last position in the media composition associated with the shot. At 633, if the indexed position X is the last indexed position in the media composition, flow may proceed to 638, and segment editing and continuity analysis of the media composition may end.

In some implementations and at 640, the media composition may be edited from segments based on the corresponding indexed position and the MCP for the segments. At 642, download priority information, such as a Download Priority Parameter (DPP), may be assigned to all segments based on the corresponding MCP. In other words, download priority of a segment may be determined by the editing device based on whether the segment is included in the media composition. In some implementations, a value of DPP=3 may indicate that a segment has a high priority for download as a member of the media composition and a value of DPP=2 may indicate that a segment has a low priority for download as an alternate segment of the media composition. In some implementations, a value of DPP=1 may indicate that a segment may not be downloaded. For example, a value of DPP=1 may be assigned to an alternate segment that has a score below a predetermined threshold value. In another example, a value of DPP=1 may be assigned to segments associated with the strikethrough information, such as the strike metadata 220, through user selection by way of a GUI (not shown), which is communicatively coupled to the editing device. In some implementations, a large number of alternate segments may be in queue by the editing device for download, and user selection may be provided to rearrange alternate segments in the queue for download and/or restrict segments in the queue from download. At 644, the segments may be downloaded based on the DPP. Other arrangements and/or configurations of segment editing and continuity analysis of a shot in the media composition are within the scope of the present disclosure.

Figure 6C:
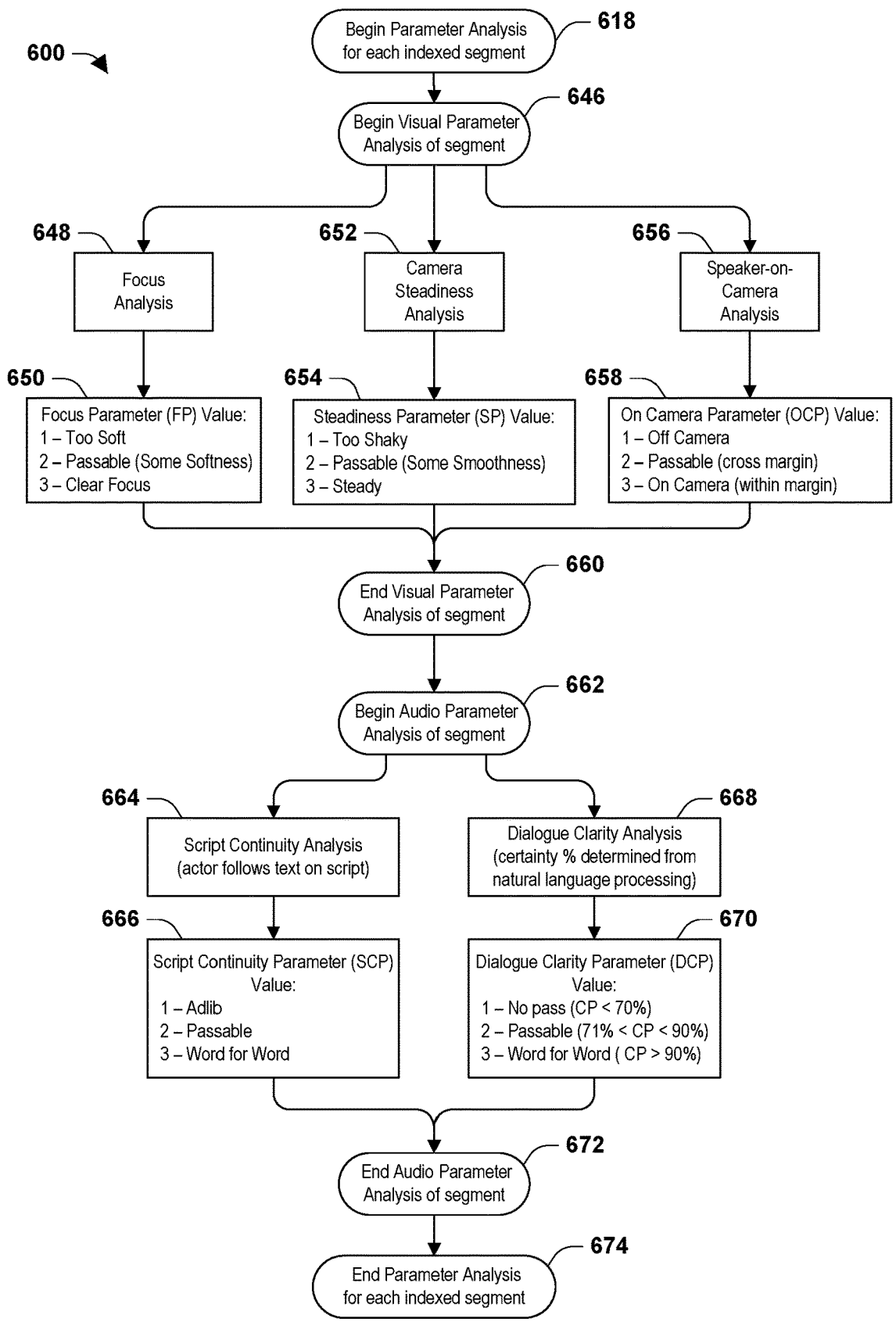

In some implementations, and as shown in FIG. 6C, parameter analysis for each indexed segment at 618 of FIG. 6A is provided. At 646, visual parameter analysis of each segment begins. At 648, focus analysis of a segment may be provided, and at 650 a focus parameter (FP) value may be assigned. At 652 camera steadiness analysis may be provided, and at 654 a Steadiness Parameter (SP) value may be assigned. At 656, speaker-on-camera analysis may be provided, and at 658 an On Camera Parameter (OCP) value may be assigned. In some implementations, the focus analysis, the camera steadiness analysis, and the speaker-on-camera analysis may be conducted in parallel, sequentially, or according to another order, for an indexed segment. At 660, the visual parameter analysis may end.

In some implementations and at 662, audio parameter analysis begins. At 664, script continuity analysis may be provided, corresponding to whether an actor follows the text set forth by the script 116, and at 666 a script continuity parameter (SCP) value may be assigned. At 668, dialogue clarity analysis may be provided, corresponding to a certainty percentage (%) as determined from natural language processing, and at 670 a dialogue clarity parameter (DCP) value may be assigned. In some implementations, the script continuity analysis and the dialogue clarity analysis may be conducted in parallel, sequentially, or according to another order, for an indexed segment. At 672, the audio parameter analysis may end, and at 674 the parameter analysis for each indexed segment may end. Other arrangements and/or operations for segment processing, media asset processing, and/or determining associated scores are within the scope of the present disclosure.

Figure 6D:
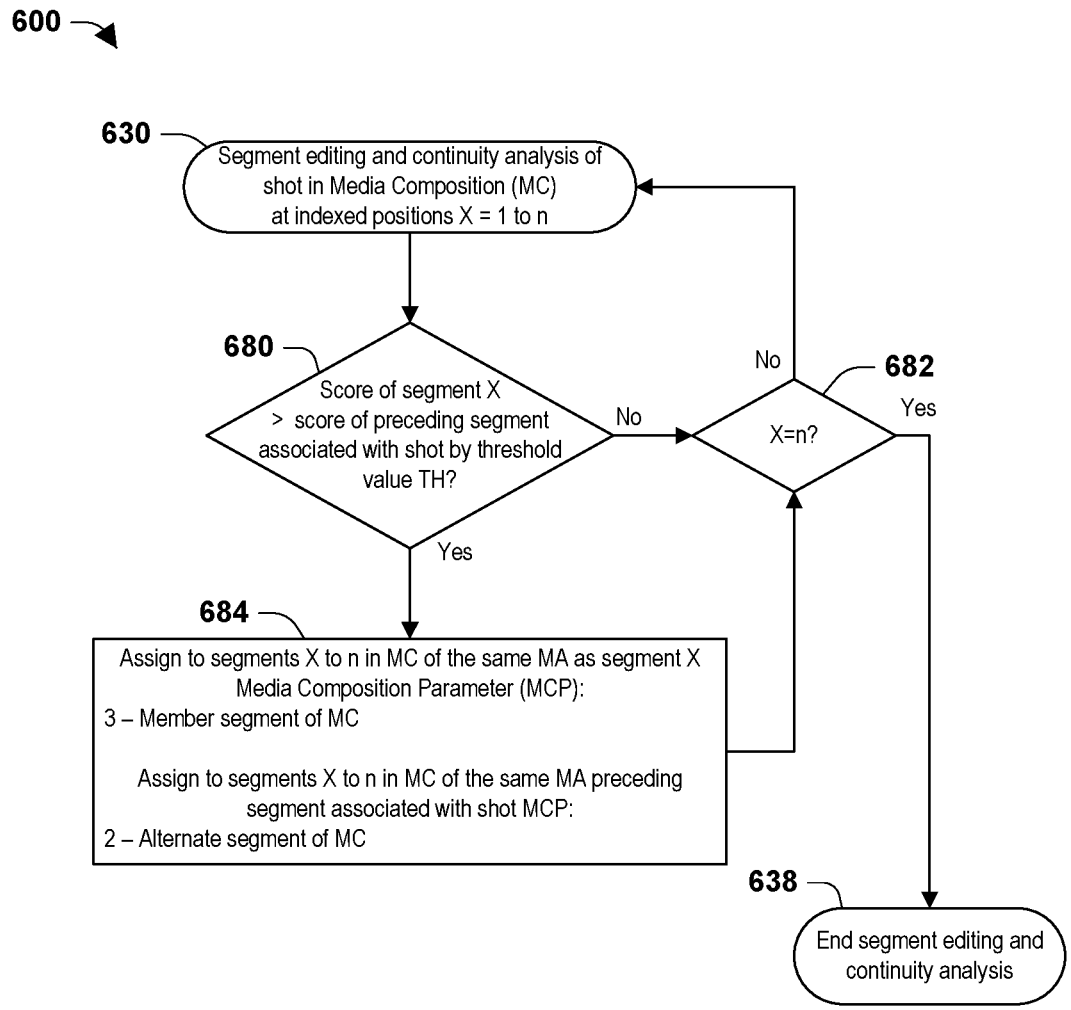

In some implementations, and as shown in FIG. 6D, segment editing and continuity analysis at 630 of FIG. 6B may be provided. During processing, segments of media assets associated with a shot may be edited into the media composition with varying associated scores. Some of the scores may have the highest score associated with a shot for the indexed position and some may not. As set forth above, if two media assets associated with the same shot, e.g., B2 and B3 set forth above with reference to FIG. 2B, have segments with close scores and a highest scoring segment is always selected, the media composition may flicker between segments from the two media assets and such flicker may be observed as a discontinuity. In some implementations, a processing flow may be provided to enhance continuity.

In some implementation, and at 630 as set forth above, segment editing and continuity analysis of a shot in the media composition may be provided for index positions X=1 to n. In some implementations, and at 680, a determination may be made whether the score of the segment X (i.e., the segment at the indexed position X) is greater than a score of a preceding segment in the media composition for the associated shot by a threshold value TH. For example, if the segment X corresponds to the segment "6" of the media asset C2 (i.e., segment C2-6 as shown in FIG. 4), the preceding segment in the media composition for the associated shot C may be in the indexed position "3" of the media composition (i.e., one of segments C1-3, C2-3, or C3-3 may be in the indexed position "3"). In this example, a determination may be made whether the score of segment C2-6 is greater than the score of the segment in the indexed position "3" of the media composition by the threshold value TH. In some implementations, the threshold value TH may be a predetermined value, such as a percentage (%) of the score of the preceding segment in the media composition for the associated shot. For example, if the segment X corresponds to the segment C2-6 of the media asset C2 and the threshold value TH=20%, the score of segment C2-6 may be greater than the score of the segment in the indexed position "3" by 20%.

In some implementation, and at 680, if the score of the segment X is not greater than the threshold value TH of the score of the preceding segment for the associated shot, flow may proceed to 682. In some implementations, and at 682, a determination may be made whether the indexed position X is the last indexed position in the media composition, i.e., whether segment X=n. At 682, if the indexed position X is not the last indexed position in the media composition, flow may loop back to 630 for analysis of the next indexed position in the media composition. At 682, if the indexed position X is the last indexed position in the media composition (i.e., if X=n), flow may proceed to 638, and segment editing and continuity analysis of the media composition may end.

In some implementations, and at 680, if the segment X is the first segment in the media composition associated with a shot, the threshold value determination of 680 may be skipped and flow may proceed to 682. For example, if segment X corresponds to the segment "3" of the media asset C2 in the media composition (i.e., segment C2-3 as shown in FIG. 4 where actor JASMINE speaks dialogue for the first time), there is no preceding segment associated with shot C and the threshold determination at 680 may be skipped. If at 680, the score of the segment X is not within the threshold value TH of the score of the preceding segment for the associated shot, flow may proceed to 684.

In some implementations, and at 684, a score of segment X may be greater than the highest score for the indexed position associated with the shot by the threshold value TH. In this implementation, the editing device may provide continuity by assigning to all segments in positions X to n, which are associated with the same media asset as segment X, the value MCP=3, designating same as members of the media composition. In this implementation, the editing device may assign to all segments in positions X to n, which are associated with the same media asset as the preceding segment associated with the shot, the value MCP=2, designating same as alternate segments. Other arrangements and/or configurations of segment editing and continuity analysis of a shot in the media composition are within the scope of the present disclosure.

In some implementations, the various operational blocks set forth above may be performed in different sequences, may be modified, and/or may be omitted, within the scope of the present disclosure. For example and in some implementations, at 616, a media asset may be parsed into indexed segments without assignment of the media asset to a shot. For example and in some implementations, at 620, parameters may be tabulated and the trained ML model may be applied to the parameters to determine scores for each parameter and scores for each media asset segment without determination of a score of an associated media asset. In some implementations, the editing device may assign segments the indexed positions of the media composition based upon the parameter analysis set forth above in FIG. 6C at 644. In some implementations, the media composition may be edited from segments based on indexed position and MCP at 640 without the segment editing and continuity analysis at 630. In other words, the media asset with the highest score as determined at 622, 624, and 626 is edited into the media composition at 640. Other arrangements and/or configurations of the operational blocks are within the scope of the present disclosure.

In some implementations, and during processing, the media asset with the highest score as determined at 622, 624, and 626 is edited into the media composition at 640. Subsequently, and in some implementations, another media asset associated with the same shot as per above is received by the editing device at 602 and processed as set forth above in FIG. 6A at 602 to 620. For example, and with reference to FIG. 4, the media asset C1 may be previously processed and the media asset C2 is subsequently received. In some implementations, the above process flow at 622, 624, and 626, and the segment editing and continuity analysis beginning at 630 and ending at 638, may be replaced by the following process flow.

Figure 6E:
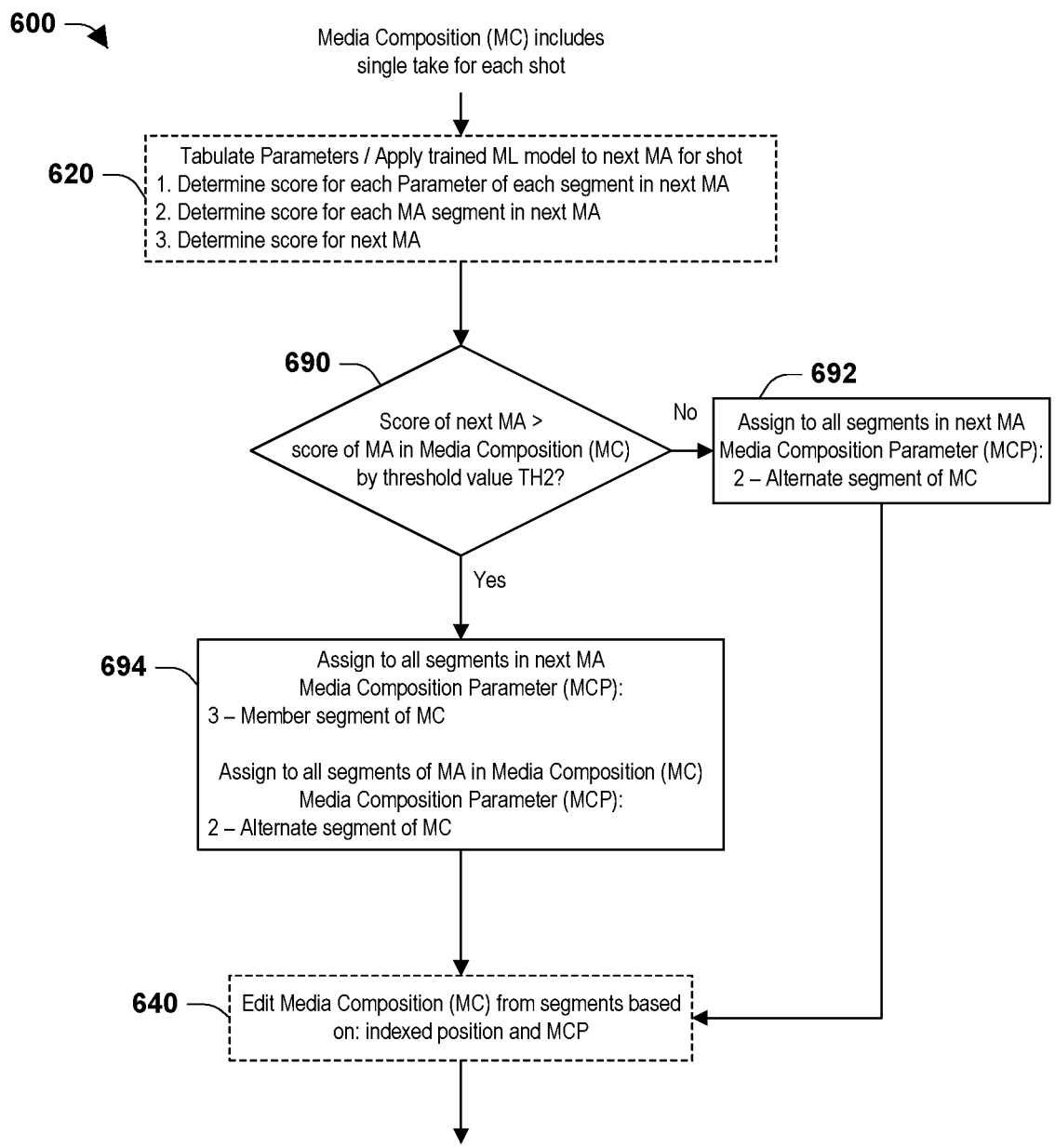

As shown in FIG. 6E, editing in the media composition may be implemented, according to some example embodiments. As set forth above, continuity may be a matter of perception, such as the perception of a director, and a shot may have a large number of takes, e.g., 5, 10, 15, etc. During editing of a first cut, the editing device may provide a media composition that includes, for example, a single take associated with each shot. The director may review multiple versions of the first cut as sequential takes, captured by the one or more cameras 102 as media assets. In this scenario, the editing device may provide scores for each media asset, as set forth above at 620, and provide the flow of FIG. 6E, as illustrated herein.

In some implementations, and as shown in FIG. 6E, the media composition may include a single take for each shot. For example and as shown in FIG. 4, the media composition may include the single take C1 associated with the shot C. In some implementations, and at 620 parameters may be tabulated and a trained ML model may be applied to the parameters to determine a score for a next media asset associated with a shot. For example, a next media asset may be C2 associated with shot C, and a score for media asset C2 may be determined. In some implementations, and at 690, the score of the next media asset received by the editing device (e.g., C2) may be compared with the score of the media asset in the media composition associated with the same shot (e.g., C1).

In some implementations, and at 690, a determination may be made whether the score of the next media asset (e.g., C2) is greater than the score of the media asset in the media composition associated with the same shot (e.g., C1) by a threshold value TH2. In some implementations, the threshold value TH2 may be a predetermined value, such as a percentage (%) of the score of the media asset in the media composition for the associated shot. For example, if the next media asset is C2, the media asset in the media composition is C1, and the threshold value TH2=20%, the score of C2 may be greater than the score of C1 by 20%. If negative at 690, flow may proceed to 692, and all segments in the next MA (e.g., C2) may be assigned with MCP=2, designating same as alternate segments in the media composition. If affirmative at 690, flow may proceed to 694. In some implementation, at 694, all segments in the next MA (e.g., C2) may be assigned with MCP=3, designating same as member segments of the media composition, and all segments associated with the same media asset in the media composition (e.g., C1) may be assigned with MCP=2. Flow may then proceed to 640, as set forth above, where the media composition may be edited from segments based on indexed position and the corresponding MCP values. Other arrangements and/or configurations for editing in the media composition are within the scope of the present disclosure.

Figure 7:
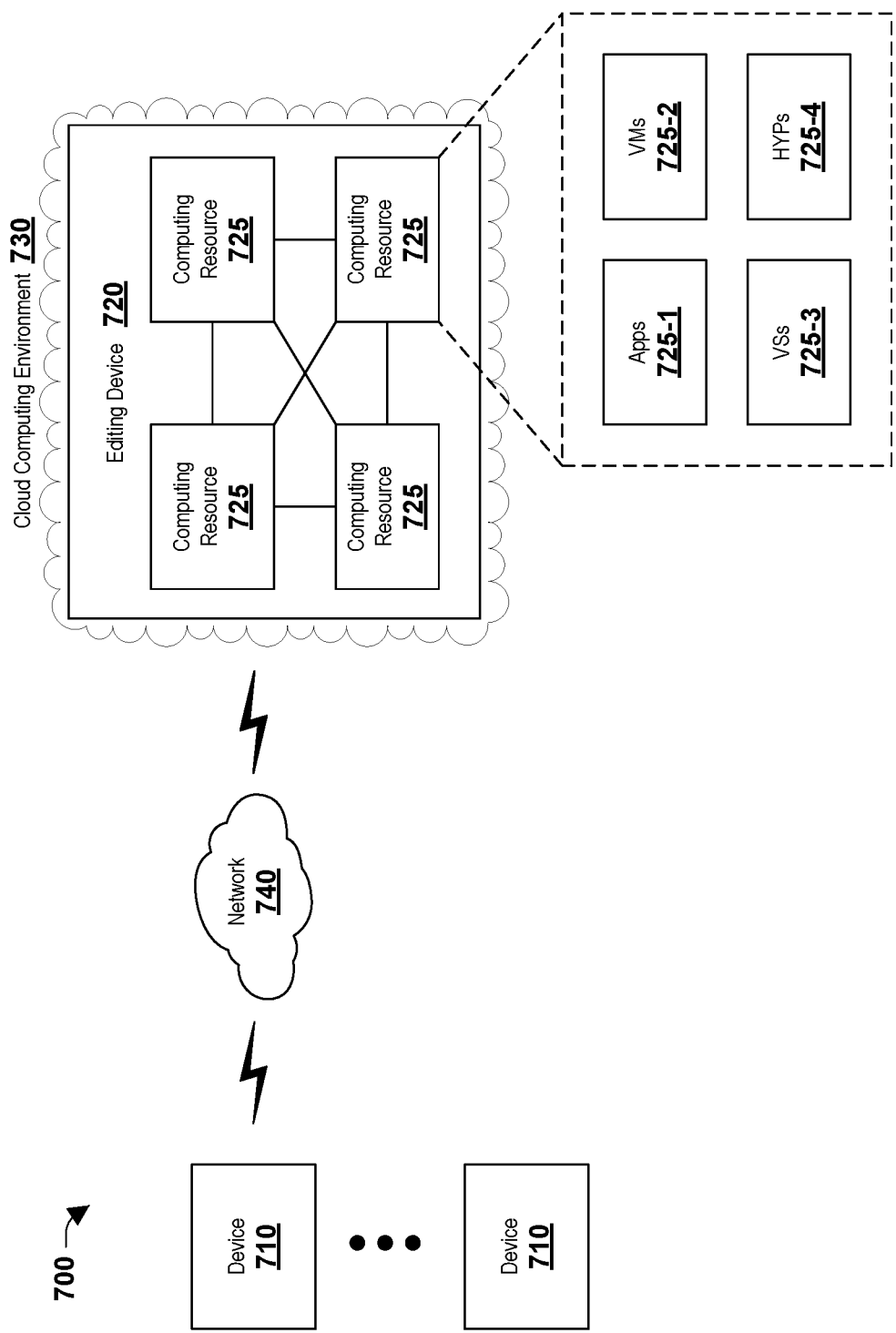
FIG. 7 is a diagram of an example environment in which systems and/or methods, described herein, may be implemented, according to some example embodiments.

FIG. 7 is an illustration of an example environment 700 in which systems and/or methods, described herein, may be implemented, according to some example embodiments. As shown in FIG. 7, the example environment 700 may include one or more devices 710 connected to an editing device 720 that access a cloud computing environment 730 by way of a network 740. The one or more devices 710 may interconnect via wired connections, wireless connections, or a combination of wired and wireless connections. In some embodiments, the one or more devices 710 may communicate with the editing device 720 in the cloud computing environment 730. According to some embodiments, the device 710 may correspond to the user device 114, the one or more communication devices 110, a device associated with the one or more communication devices 110, and/or a device responding to and/or communicating with the one or more communication devices 110. According to some example embodiments, the editing device 720 may be a container platform and/or a component of the container platform (e.g., a cloud platform server). In some implementations, the editing device 720 may be included in a Multi-access Edge Computing (MEC) platform (also referred to as Mobile Edge Computing platform) communicatively coupled with a network, such as a cellular 5G network, to allow high network computing loads to be transferred onto edge servers, which can minimize latency and reduce backhaul, among other things, depending on the network path between the edge servers and the point of attachment (e.g., a wireless station for a user device). In some implementations, the editing device 720 may provision an application service to execute the editing of the media composition by auto-scaling to allocate multiple network resources. In some implementations, the auto-scaling may include: horizontal auto-scaling to adjust a number of instances of one or more network resources, vertical auto-scaling to adjust a number of instances of the one or more network resources, or a combination of both.

The device 710 may include one or more devices capable of receiving, generating, storing, processing, and/or providing information, such as information described herein. For example, the device 710 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, the device 710 may receive information from and/or transmit information to the editing device 720. The device 710 may be referred to collectively as "devices 710" and individually as "the device 710."

In some example implementations, the editing device 720 may include one or more devices that utilize machine learning to determine data storage pruning parameters. In some implementations, the editing device 720 may be designed to be modular such that certain software components may be swapped in or out depending on a particular need. The editing device 720 may be reconfigured for different uses. In some implementations, the editing device 720 may receive information from and/or transmit information to one or more devices 710. In some implementations, the editing device 720 may be provided by a cloud platform server. In some implementations, the editing device 720 may be provided in the same cloud computing environment as the cloud computing with the containers or in a different cloud computing than the cloud computing environment with the containers.

In some example implementations, the editing device 720 may be hosted in the cloud computing environment 730. In some implementations, the editing device 720 may not be cloud-based such that the editing device 720 may be implemented outside of a cloud computing environment. In some implementations, the editing device 720 may be partially cloud-based.

In some example implementations, the cloud computing environment 730 may comprise an environment that hosts the editing device 720. The cloud computing environment 730 may provide computation, software, data access, storage, etc. services that do not involve end-user knowledge of a physical location and configuration of system(s) and/or device(s) that host the editing device 720. The cloud computing environment 730 may include a group of computing resources 725. The group of computing resources 725 may be referred to collectively as "computing resources 725" and individually as the "computing resource 725". In some implementations, each of the computing resources 725 corresponds to a container in the editing device 720. In some implementations, each of the computing resources 725 corresponds to more than one container in the editing device 720. In some implementations, the editing device 720 includes a container corresponding to more than one of the computing resources 725.

In some example implementations, the computing resource 725 may include one or more personal computers, workstation computers, server devices, or other types of computation and/or communication devices. In some implementations, the computing resource 725 may host the editing device 720. The cloud resources may include compute instances executing in the computing resource 725, storage devices provided in the computing resource 725, data transfer devices provided by the computing resource 725, etc. In some example implementations, the computing resource 725 may communicate with other computing resources 725 via wired connections, wireless connections, or a combination of wired and wireless connections.

In some example implementations, the computing resources 725 may include a group of cloud resources, such as one or more applications ("APPs") 725-1, one or more virtual machines ("VMs") 725-2, virtualized storage ("VSs") 725-3, one or more hypervisors ("HYPs") 725-4, and/or other cloud resources.

In some example implementations, the application 725-1 may include one or more software applications that may be provided to or accessed by the device 710. The application 725-1 may eliminate a need to install and execute the software applications on the device 710. In an example, the application 725-1 may include software associated with the editing device 720 and/or any other software capable of being provided via the cloud computing environment 730. In some implementations, one application 725-1 may send/receive information to/from one or more other applications 725-1, via the virtual machine 725-2.

In some example implementations, the virtual machine 725-2 may include a software implementation of a machine (e.g., a computer) that executes programs in a configuration of a physical machine. The virtual machine 725-2 may be either a system virtual machine or a process virtual machine, and may change in response to a use and/or a degree of the first application to any real machine by the virtual machine 725-2. A system virtual machine may provide a system platform that supports execution of a complete operating system. A process virtual machine may execute a single program, and may support a single process. In some implementations, the virtual machine 725-2 may execute on behalf of a user (e.g., a user of the device 710, an operator of the editing device 720, etc.), and may manage infrastructure of the cloud computing environment 730, such as data management, synchronization, or data transfers.

In some example implementations, the virtualized storage 725-3 may include one or more storage systems and/or one or more devices that use virtualization techniques within the storage systems or devices of the computing resources 725. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. File virtualization may enable optimization of storage use, server consolidation, and/or performance of non-disruptive file migrations.

In some example implementations, the hypervisor 725-4 may provide hardware virtualization techniques that allow multiple operating systems (e.g., "guest operating systems") to execute concurrently on a host computer, such as the computing resources 725. The hypervisor 725-4 may present a virtual operating platform to the guest operating systems, and may manage the execution of the guest operating systems. Multiple instances of a variety of operating systems may share virtualized hardware resources.

In some example implementations, the network 740 may include one or more wired and/or wireless networks. In an example, the network 740 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, and/or the like, and/or a combination of these or other types of networks.

The number and/or arrangement of devices and networks illustrated in FIG. 7 are provided as an example. There may be additional devices and/or networks, fewer devices and/or networks, different devices and/or networks, or differently arranged devices and/or networks than illustrated in FIG. 7. Two or more devices illustrated in FIG. 7 may be implemented within a single device, or a single device illustrated in FIG. 7 may be implemented as multiple, distributed devices. Additionally, or alternatively, a set of devices (e.g., one or more devices) of the example environment 700 may perform one or more functions described as being performed by another set of devices of the example environment 700.

Figure 8:
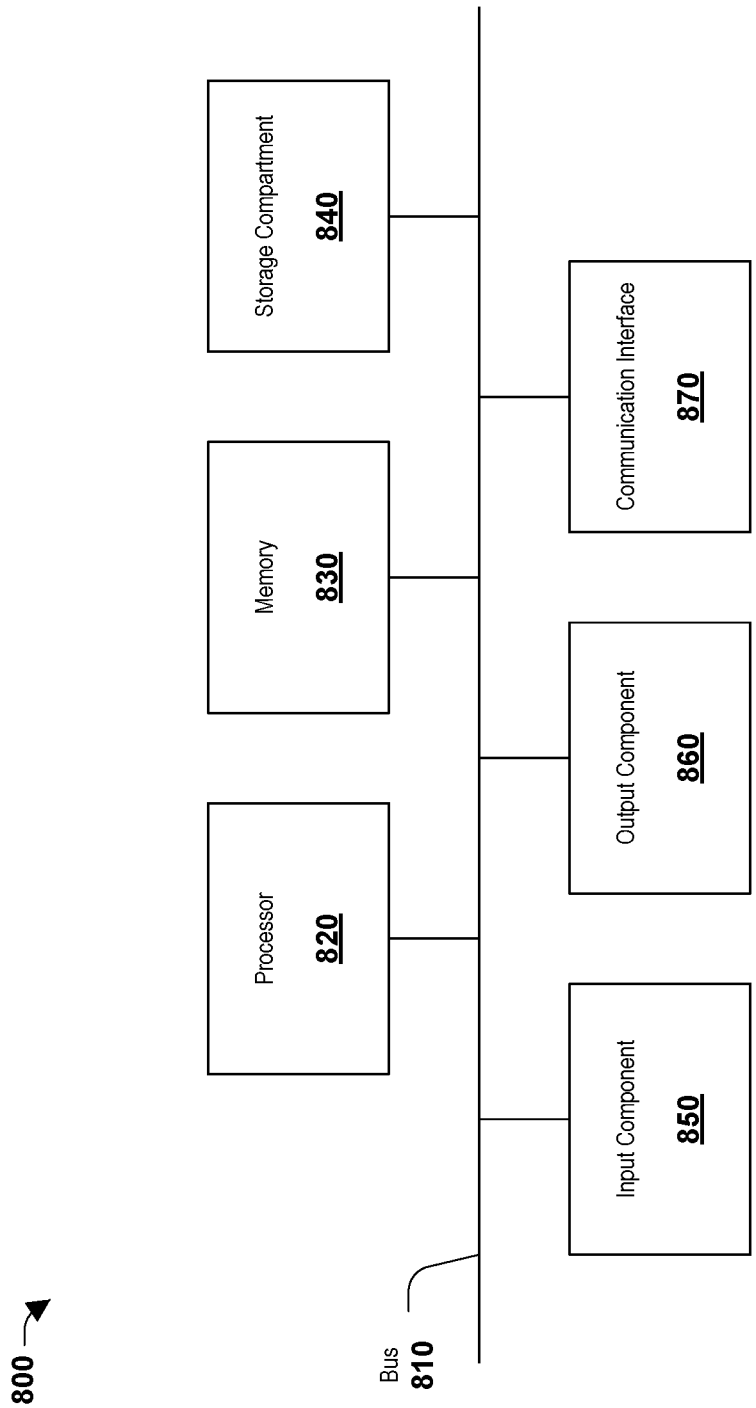
FIG. 8 is a diagram illustrating example components of one or more devices of FIG. 7, according to some example embodiments.

FIG. 8 is an illustration of example components of a device 800, according to some example embodiments. The device 800 may correspond to the user device 114, the one or more communication devices 110, the editing device 720, a device associated with the editing device 720, a device responding to and/or communicating with the editing device 720, the RPA engine 127, and/or the one or more cameras 102.

As illustrated in FIG. 8, the device 800 may include a bus 810, a processor 820, a memory 830, a storage component 840, an input component 850, an output component 860, and a communication interface 870. The bus 810 may include a component that permits communication among the components of the device 800. The processor 820 may be implemented in hardware, firmware, or a combination of hardware and software. The processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 820 may include one or more processors capable of being programmed to perform a function. The memory 830 may include a random access memory (RAM), a read only memory (ROM), and/or another type of dynamic or static storage device (e.g., a flash memory, a magnetic memory, and/or an optical memory) that stores information and/or instructions for use by the processor 820.

In some embodiments, the storage component 840 may store information and/or software related to the operation and use of the device 800. For example, the storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The input component 850 may include a component that permits the device 800 to receive information, such as via user input (e.g., a touch screen display, a keyboard, a keypad, a mouse, a button, a switch, and/or a microphone). Additionally, or alternatively, the input component 850 may include a sensor for sensing information (e.g., a global positioning system (GPS) component, an accelerometer, a gyroscope, and/or an actuator). The output component 860 may include a component that provides output information from the device 800 (e.g., a display, a speaker, and/or one or more light-emitting diodes (LEDs)). The communication interface 870 may include a transceiver-like component (e.g., a transceiver and/or a separate receiver and transmitter) that enables the device 800 to communicate with other devices, such as via a wired connection, a wireless connection, or a combination of wired and wireless connections. The communication interface 870 may permit the device 800 to receive information from another device and/or provide information to another device. For example, the communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

In some embodiments, the device 800 may perform one or more processes described herein. The device 800 may perform these processes based on the processor 820 executing software instructions stored by a non-transitory computer-readable medium, such as the memory 830 and/or the storage component 840. A computer-readable medium may be defined herein as a non-transitory memory device. A memory device includes memory space within a single physical storage device or memory space spread across multiple physical storage devices. Software instructions may be read into the memory 830 and/or the storage component 840 from another computer-readable medium or from another device via the communication interface 870. When executed, software instructions stored in the memory 830 and/or the storage component 840 may cause the processor 820 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. The number and arrangement of the components shown in FIG. 8 are provided as an example. In practice, the device 800 may include additional components, fewer components, different components, or differently arranged components than those shown in FIG. 8. Additionally, or alternatively, a set of components (e.g., one or more components) of device 800 may perform one or more functions described as being performed by another set of components of the device 800.

Figure 9:
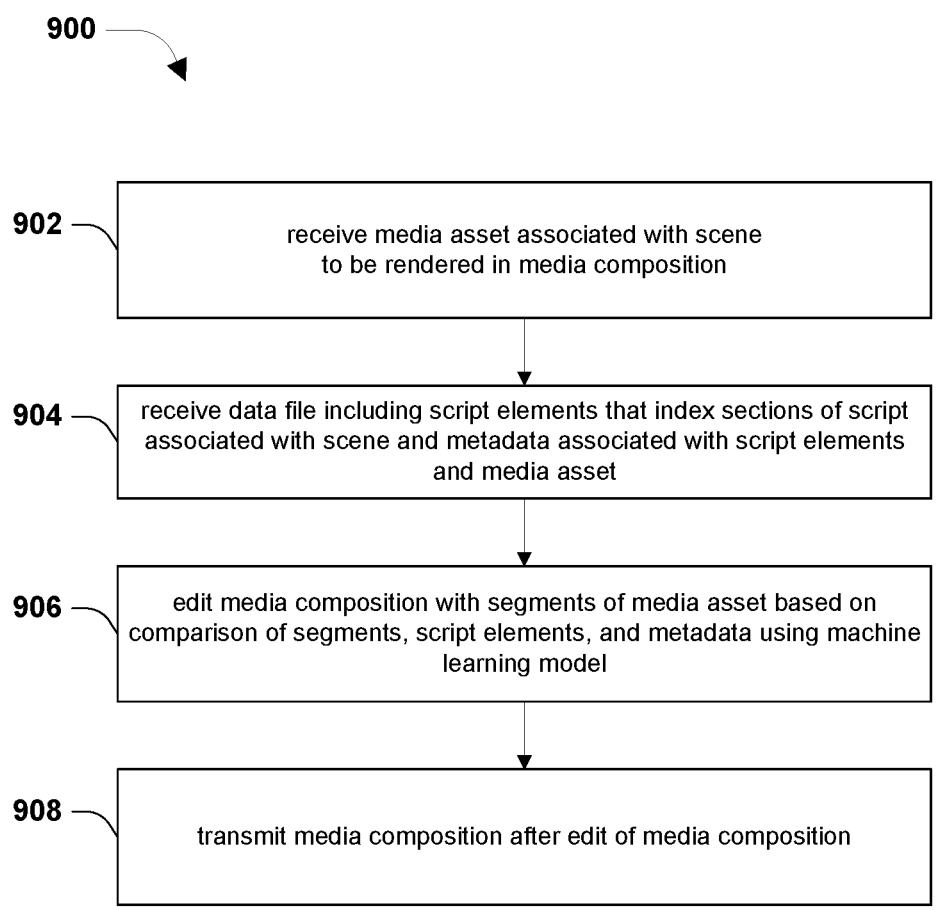
FIG. 9 is a flow chart of an example method for editing a media composition, according to some example embodiments.

FIG. 9 is a flow chart of an example method 900 for editing a media composition, according to some example embodiments. At 902, a media asset associated with a scene to be rendered in media composition may be received. For example, in FIG. 1, and by reference number 112, the media asset 107 may be identified with take metadata 214 as associated with the scene 206 to be rendered in the media composition 404 may be received by the editing device 720. At 904, a data file including script elements that index sections of a script associated with a scene and metadata associated with the script elements and the media asset may be received. For example, in FIG. 1, the data file 117 may include the script 116. In FIG. 2, the script 116 may include the script elements 202 that index the sections 210 associated with the scene 206. Metadata 118 may be associated with the script elements 202. In FIG. 1, and by reference number 120, the script and the metadata may be received by the editing device 720. At 906, a media composition may be edited with a machine learning model into a media composition based on a comparison of segments of a media asset, script elements, and metadata. For example, in FIG. 1, and by reference number 122, the editing device may perform editing of a media composition. At 908, a media composition may be transmitted after editing of the media composition. For example, in FIG. 1, and by reference number 124, the media composition may be transmitted after the editing. The example method 600 may include additional implementations, such as any single implementation or any combination of implementations described herein and/or described with regard to any other process described herein.

Figure 10:
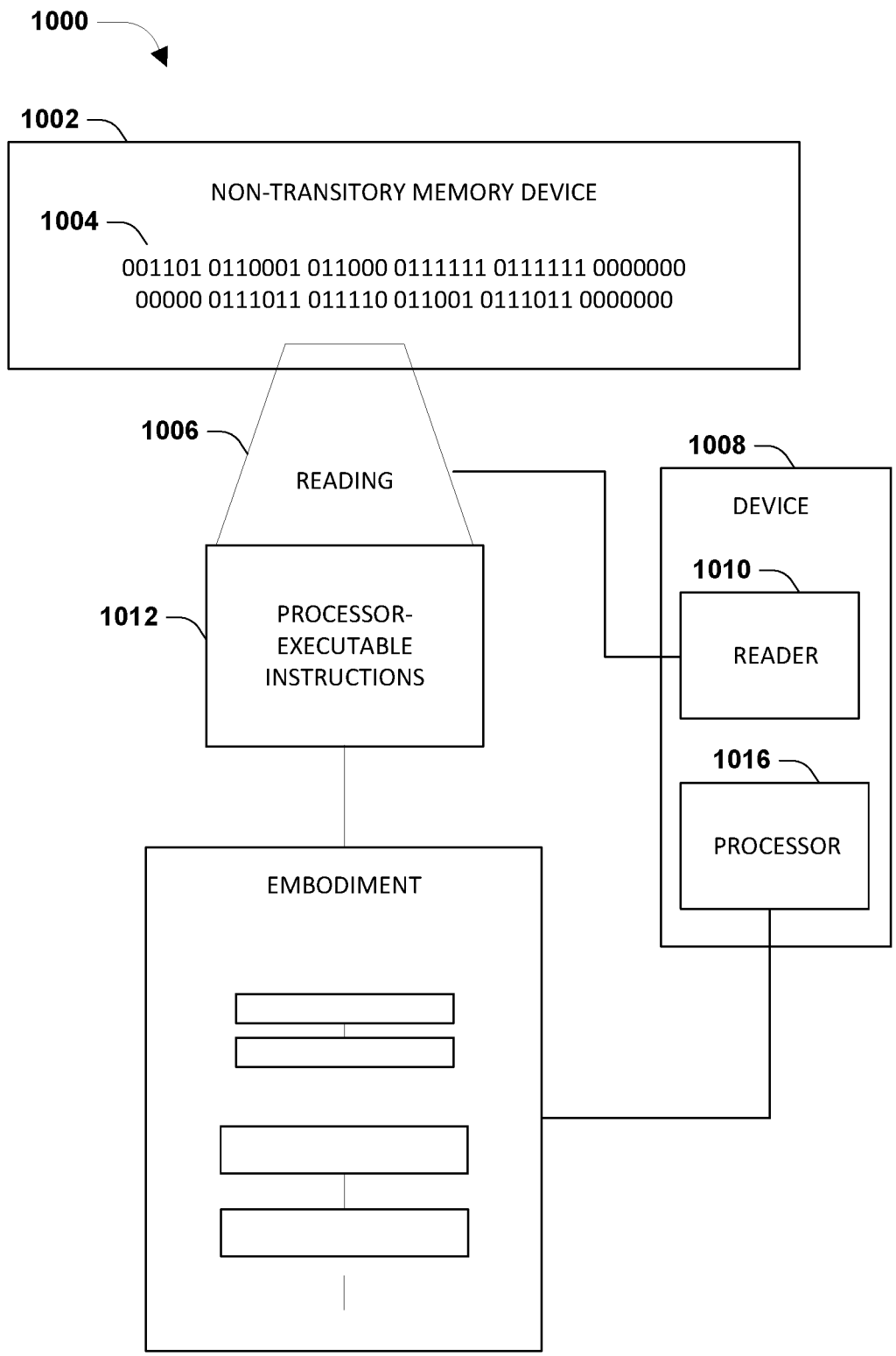
FIG. 10 is an illustration of a scenario involving an example non-transitory machine readable medium, according to some example embodiments.

FIG. 10 is an illustration of a scenario 1000 involving an example non-transitory machine readable medium 1002. The example non-transitory machine readable medium 1002 may comprise processor-executable instructions 1012 that when executed by a processor 1016 cause performance (e.g., by the processor 1016) of at least some of the provisions herein. The example non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 900 of FIG. 9, for example. In some embodiments, the processor-executable instructions 1012 are configured to cause implementation of a system, such as at least some of the editing device 720 of FIG. 7, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    receiving, by an editing device and from one or more communication devices communicatively coupled to the editing device through a wireless network, a media asset associated with a scene to be rendered in a media composition;
    receiving, by the editing device, a data file including script elements that index script sections associated with the scene, and metadata associated with the script elements and the media asset;
    editing, by the editing device and with a machine learning model, the media composition with segments of the media asset based on a comparison of the segments of the media asset, the script elements, and the metadata; and
    transmitting, by the editing device and to the one or more communication devices, the media composition after the editing of the media composition.

2. The method of claim 1, wherein editing the media composition comprises:
    determining a score of the media asset based on one or more weighted parameters respectively corresponding to the segments of the media asset;
    assigning the media asset and the score of the media asset to a set of media assets, wherein each media asset in the set of media assets includes corresponding segments and has a corresponding score;
    selecting a media asset from the set of media assets based on the scores of the media assets; and
    editing the media composition with the segments of the selected media asset based on a comparison of the segments of the selected media asset and the script elements.

3. The method of claim 1, wherein editing the media composition comprises:
    assigning indexed positions to the media composition corresponding to the script elements;
    indexing the segments of the media asset with the indexed positions of the media composition based on a comparison of the segments of the media asset and the script elements;
    determining a score of each indexed segment based on one or more corresponding weighted parameters;
    assigning each indexed segment and the score of each indexed segment to a corresponding set of indexed segments, wherein each indexed segment in the corresponding set of indexed segments is indexed with a same indexed position, is associated with a different media asset, and has a corresponding score;

selecting, for each indexed position of the media composition, an indexed segment from the corresponding set of indexed segments based on the score of each indexed segment; and editing, for each indexed position of the media composition, the media composition with the selected indexed segment.

4. The method of claim 1, wherein editing the media composition comprises:

indexing the segments of the media asset with indexed positions based on a comparison of the segments of the media asset and the script elements;

determining a score of each indexed segment based on one or more corresponding weighted parameters; and editing, for each indexed position, the media composition with an indexed segment having a highest score from a set of indexed segments corresponding to the indexed position.

5. The method of claim 1, wherein the media asset is a first media asset, the method further comprising:

receiving, by the editing device and from the one or more communication devices communicatively coupled to the editing device through a wireless network, a second media asset associated with the scene; and wherein editing the media composition comprises:
determining a score of the first media asset based on one or more corresponding weighted parameters;
determining a score of the second media asset based on one or more corresponding weighted parameters; and
editing the media composition with segments of the second media asset if the score of the second media asset is greater than the score of the first media asset by a threshold value.

6. The method of claim 1, wherein editing the media composition comprises:

assigning indexed positions to the media composition corresponding to the script elements;

indexing the segments of the media asset with the indexed positions of the media composition based on a comparison of the segments of the media asset and the script elements;

detecting whether strikethrough information is associated with each indexed segment based on a comparison of the metadata and the script elements, wherein the strikethrough information indicates a segment to be excluded from the media composition; and editing, for each indexed position of the media composition, the media composition with an indexed segment that is not associated with the strikethrough information.

7. The method of claim 1, wherein editing the media composition comprises:

determining, for each segment of the media asset, a visual parameter indicating a visual quality value of the segment and an audio parameter indicating an audio quality value of the segment;

determining, for each segment of the media asset, a score by:
applying a weight to the visual parameter to obtain a weighted visual parameter,
applying a weight to the audio parameter to obtain a weighted audio parameter, and
compiling the weighted visual parameter and the weighted audio parameter to obtain the score of the segment;

assigning, for each segment of the media asset, the segment to at least one of a first set of segments or a second set of segments, based on the score of the segment; and editing the media composition with the first set of segments.

8. The method of claim 7, further comprising:

transmitting, by the editing device and to the one or more communication devices through the wireless network, the second set of segments after transmitting the media composition.

9. The method of claim 1, wherein the media asset is a first media asset, the method further comprising:

receiving, by the editing device and from the one or more communication devices, a second media asset associated with the scene; and wherein editing the media composition comprises:
assigning indexed positions to the media composition corresponding to the script elements;
indexing the segments of the first media asset with corresponding indexed positions of the media composition based on a comparison of the segments of the first media asset and the script elements;
determining a corresponding score of each indexed segment of the first media asset based on one or more corresponding weighted parameters;
indexing segments of the second media asset with corresponding indexed positions of the media composition based on a comparison of the segments of the second media asset and the script elements;
determining a corresponding score of each indexed segment of the second media asset based on one or more corresponding weighted parameters;
assigning, for each indexed position of the media composition, each corresponding indexed segment of the first media asset and each corresponding indexed segment of the second media asset to one of a first set of indexed segments or a second set of indexed segments based on the corresponding score; and
editing the media composition with the first set of indexed segments.

10. The method of claim 9, wherein the first media asset is identified as a first take associated with a first shot of the scene and the second media asset is identified as at least one of:

a second take associated with the first shot of the scene, or a first take associated with a second shot of the scene, the method further comprising:
transmitting, by the editing device and to the one or more communication devices through the wireless network, the second set of indexed segments after transmitting the media composition.

11. The method of claim 1, further comprising:

determining, by the editing device, a parameter associated with the media asset;

assigning, by the editing device, upload priority information to the media asset based on the parameter, the upload priority information to be used by the one or more communication devices to assign a priority of transmission of the media asset in a communication buffer of the one or more communication devices; and transmitting, by the editing device, the upload priority information to the one or more communication devices.

12. The method of claim 11, wherein the parameter is at least one of:
a take quality parameter of the media asset, determined by the editing device from the metadata, specifying a user input quality of the media asset;
a first score of the media asset based on a comparison to scores of other media assets in a set of media assets; or
a second score of the media asset, determined by the editing device and using the machine learning model, based on a compilation of one or more weighted parameters respectively corresponding to the segments of the media asset.

13. The method of claim 11, wherein the upload priority information causes the one or more communication devices to stop transmission of the media asset and to initiate transmission of a next media asset in the communication buffer.

14. The method of claim 1, further comprising:
determining, by the editing device, a parameter associated with the media asset; and
assigning, by the editing device, download priority information to the segments of the media asset based on the parameter, the download priority information to indicate a priority for download of the segments to the one or more communication devices.

15. A device, comprising:
one or more processors configured to:
receive, from one or more communication devices through a wireless network, a media asset associated with a scene to be rendered in a media composition;
receive a data file including script elements that index script sections associated with the scene, and metadata associated with the script elements and the media asset;
edit, with a machine learning model, the media composition with segments of the media asset based on a comparison of the segments of the media asset, the script elements, and the metadata; and
transmit, to the one or more communication devices through the wireless network, the media composition after the edit of the media composition.

16. The device of claim 15, wherein the one or more processors are further configured to:
edit the media composition, the edit to:
assign indexed positions to the media composition corresponding to the script elements;
index the segments of the media asset with the indexed positions of the media composition based on a comparison of the segments of the media asset and the script elements;
determine a score of each indexed segment based on one or more corresponding weighted parameters;
assign each indexed segment and the score of each indexed segment to a corresponding set of indexed segments, wherein each indexed segment in the corresponding set of indexed segments is indexed with a same indexed position, is associated with a different media asset, and has a corresponding score;
select, for each indexed position of the media composition, an indexed segment from the corresponding set of indexed segments based on the score of each indexed segment; and
edit, for each indexed position of the media composition, the media composition with the selected indexed segment.

17. The device of claim 15, wherein the one or more processors are further configured to:
determine a parameter associated with the media asset;
assign upload priority information to the media asset based on the parameter, the upload priority information to be used by the one or more communication devices to assign a priority of transmission of the media asset in a communication buffer of the one or more communication devices; and
transmit the upload priority information to the one or more communication devices, wherein the upload priority information to cause the one or more communication devices to stop transmission of the media asset and to initiate transmission of a next media asset in the communication buffer.

18. The device of claim 15, wherein the one or more processors are further configured to:
edit the media composition, the edit to:
determine, for each segment of the media asset, at least one visual parameter indicating a visual quality value of the segment and at least one audio parameter indicating an audio quality value of the segment;
determine, for each segment of the media asset, a score based on the at least one visual parameter and the at least one audio parameter;
assign, for each segment of the media asset, the segment to at least one of a first set of segments or a second set of segments, based on the score of the segment; and
edit the media composition with the first set of segments.

19. The device of claim 18, wherein the one or more processors are further configured to:
transmit, to the one or more communication devices through the wireless network, the second set of segments after the transmit of the media composition.

20. A non-transitory computer-readable medium storing instructions, the instructions comprising:
one or more instructions that, when executed by one or more processors of a device, cause the one or more processors to:
receive, from one or more communication devices through a wireless network, a media asset associated with a scene to be rendered in a media composition;
receive a data file including script elements that index script sections associated with the scene, and metadata associated with the script elements and the media asset;
edit, with a machine learning model, the media composition with segments of the media asset based on a comparison of the segments of the media asset, the script elements, and the metadata; and
transmit, to the one or more communication devices through the wireless network, the media composition after the edit of the media composition.

* * * * *